(12) United States Patent
Miller et al.

(10) Patent No.: US 7,149,754 B2
(45) Date of Patent: Dec. 12, 2006

(54) METHOD FOR TRANSMITTING A TRANSFERABLE INFORMATION PACKET

(75) Inventors: Gregory Miller, Severna Park, MD (US); Michael R. Miller, Deerfield Beach, FL (US); William H. Carpenter, Severna Park, MD (US)

(73) Assignee: William H. Carpenter, Jr., Severna Park, MD (US)

( * ) Notice: Subject to any disclaimer, the term of this patent is extended or adjusted under 35 U.S.C. 154(b) by 761 days.

(21) Appl. No.: 10/197,809

(22) Filed: Jul. 19, 2002

(65) Prior Publication Data

US 2003/0018777 A1   Jan. 23, 2003

(51) Int. Cl.
G06F 7/00 (2006.01)
G06Q 30/00 (2006.01)

(52) U.S. Cl. ...................... 707/104.1; 705/26
(58) Field of Classification Search .............. 707/1, 707/104.1; 705/26
See application file for complete search history.

(56) References Cited

U.S. PATENT DOCUMENTS

| | | | |
|---|---|---|---|
| 5,664,110 A | 9/1997 | Green et al. | 705/26 |
| 5,893,076 A | 4/1999 | Hafner et al. | 705/28 |
| 5,991,760 A * | 11/1999 | Gauvin et al. | 707/10 |
| 6,094,655 A * | 7/2000 | Rogers et al. | 707/10 |
| 6,272,484 B1 * | 8/2001 | Martin et al. | 707/1 |
| 6,335,742 B1 * | 1/2002 | Takemoto | 715/781 |
| 6,374,260 B1 * | 4/2002 | Hoffert et al. | 707/104.1 |
| 6,691,108 B1 * | 2/2004 | Li | 707/3 |
| 6,901,379 B1 * | 5/2005 | Balter et al. | 705/27 |
| 2003/0110097 A1 * | 6/2003 | Lei | 705/27 |
| 2003/0115295 A1 * | 6/2003 | Potts et al. | 709/219 |

OTHER PUBLICATIONS

X.F. Wang, S.C. Zhang, and P.K. Khosta H. Kiliccote, *Anytime algorithm for agent-mediated merchant information gathering*, Proceedings of the fourth international conference on Autonomous agents, Jun. 2000.

* cited by examiner

*Primary Examiner*—Don Wong
*Assistant Examiner*—Thanh-Ha Dang
(74) *Attorney, Agent, or Firm*—Winston & Strawn LLP

(57) ABSTRACT

The invention relates to a method of and system for loading information onto a computer in the form of a digital capsule containing information about one of more aspects of a subject, such as products for sale. Preferably, it can then be determined whether the information from the capsule should be updated when the subject is accessed on a user's computer, and, if so, the capsule information can be updated. The capsule is preferably linked to a file containing a representation of the subject and can be exchanged between computers.

27 Claims, 13 Drawing Sheets

METHOD FOR TRANSMITTING A TRANSFERABLE INFORMATION PACKET

FIELD OF THE INVENTION

The invention relates to methods and systems for providing and viewing digital media with additional information on the subject matter of the digital media, and to maintain updates to the additional information. More specifically, it relates to the linking of a capsule of information to media files in a manner which allows for a viewer to access updated information easily, and for the capsule to be updated.

BACKGROUND OF THE INVENTION

The dynamic evolution of the Internet has led to an influx of new services, applications and technologies that are being brought to the market. With the increasing success of services such as electronic commerce applications, online news providing, online gaming, music sharing applications, and other emerging value-added services, competitive pressures dictate that companies implement a third dimension within the existing information providing technologies.

The Internet is a global computer network which comprises a vast number of computers and computer networks which are interconnected through communication links. The interconnected computers exchange information using various services, such as electronic mail, Gopher, FTP ("File Transfer Protocol"), NNTP ("Network News Transfer Protocol"), and the World Wide Web (hereinafter, the "WWW").

The WWW allows a server computer system (a web server) to send media-filled web pages of information to a remote client computer system. The remote client computer system can then display the web pages through a browser. Underlying the user interface represented by web browsers, are the networks and the protocol that control the wires to the servers or "engines" that process requests, and return the various media. The standard protocol of the web is known as HTTP, for HyperText Transfer Protocol. HTTP stands at the very core of the World Wide Web. According to the HTTP 1.0 specification, the HyperText Transfer Protocol is an application-level protocol with the functionality necessary for distributed, collaborative, hypermedia information systems. It is a generic, object-oriented protocol which can be used for many tasks, such as name servers and distributed object management systems, through extension of its request methods (commands). One of the noted features of HTTP is data typing and negotiation of differential data representations, allowing systems to be built independently of the data being transferred.

The simplicity of the hypertext transfer protocol, the client-server paradigm, and the supporting infrastructure of the Internet, led to the development of versatile browsers such as Netscape™ and Internet Explorer™. These browsers implement "hypermedia"—multimedia capabilities such as graphics, sound, and movies, linked in a World Wide Web of hypertext. The text can be formatted in various fonts, styles, colors and sizes. Pages can contain pictures, sounds, and movies (multimedia). The technology enables server-side programming with CGI, or client-side programming with Java, Javascript, and other programming languages.

The language used for publishing hypertext on the World Wide Web is HTML (HyperText Markup Language). HTML is a non-proprietary format for describing the structure of hypermedia documents—plain text (ASCII) files with embedded codes for logical markup, using tags like <A> and </A> to structure text into tables, hypertext links, interactive forms, headings, paragraphs, lists, and more.

An alternative language that could be used is DHTML or "Dynamic HTML" which is typically used to describe the combination of HTML, style sheets and scripts that allows documents to be animated. Dynamic HTML allows a web page to change after it is loaded into the browser—there does not have to be any communication with the web server for an update. For example, a piece of text can change from one size or color to another, or a graphic can move from one location to another, in response to some kind of user action, such as clicking a button. Dynamic HTML allows manipulation of any page element, including changing styles, positioning, and content at any time. It provides a richer, more dynamic experience on web pages, making them more like dynamic applications and less like static content.

A more sophisticated version of DHTML is Microsoft's Active Server Pages™ (ASP) technology which provides a framework for building dynamic HTML pages which enable Internet and Intranet applications to be interactive. ASPs are implemented using server side scripting that can be performed in any language such as Visual Basic™, Javascript, Java or C. ASP allows interaction with ODBC compliant databases on the web server, such as: Microsoft Access™, Microsoft SQL Server™, Oracle™, Informix™, or Sybase™. ActiveX controls can optionally be used to encapsulate functions on the client computer that interact with ASP on the server. An Active Server Page is developed in a text file just like an HTML page. Developers can use any text editor to create an ASP. Both Netscape Navigator™ and Microsoft Internet Explorer™ browsers as well as other browsers can view ASP pages because the ASP is executed on the server and delivered to the client computer as simple HTML.

One of the more popular web programming languages is Java. Java is a general purpose programming language with a number of features that make the language well suited for use on the World Wide Web. It is an object-oriented language similar to C++, but simplified to eliminate language features that cause common programming errors. Small Java applications are called Java applets and can be downloaded from a Web server and run on a personal computer (PC) by a Java-compatible Web browser, such as Netscape Navigator or Microsoft Internet Explorer. Java source code files (files with a java extension) are compiled into a format called bytecode (files with a class extension), which can then be executed by a Java interpreter. Compiled Java code can run on most computers because Java interpreters and runtime environments, known as Java Virtual Machines (VMs), exist for most operating systems, including UNIX, the Macintosh OS, and Windows. Bytecode can also be converted directly into machine language instructions by a just-in-time compiler (JIT).

To make an HTML page more dynamic, Javascript statements may be imbedded directly within the HTML page. JavaScript is a compact, object-based scripting language for developing client and server Internet applications. The Javascript statements can recognize and respond to user events such as mouse clicks, form input, and page navigation. For example, a JavaScript function can be written to verify that users enter valid information into a form. Without any network transmission, an HTML page with embedded JavaScript can interpret the entered text and alert the user with a message dialog if the input is invalid. Alternatively, JavaScript can be used to perform an action (such as play an audio file, execute an applet, or communicate with a plug-in) in response to the user opening or exiting a page.

TCP/IP (Transmission Control Protocol/Internet Protocol) was designed to build an interconnection of networks that provide universal communication services such as Internetwork or Internet. Each physical network has its own technology-dependent communication interface in the form of a programming interface that provides basic communication functions. Communication services are provided by software that runs between the physical network and the user applications and provides a common interface for these applications, independent of the underlying physical network. The architecture of the physical networks are hidden from the user. TCP/IP interconnects different physical networks to form what appears to the user to be one large network. Such a set of interconnected networks is called an Internetwork or an Internet. To interconnect two networks, a computer is needed that is attached to both networks and that can forward packets from one network to the other. Such a machine is called a Router. The term IP Router is also used because the routing function is part of the IP layer of the TCP/IP protocol suite.

To be able to identify a host on the Internetwork, each host is assigned an address, the IP address. When a host has multiple network adapters, each adapter has a separate IP address. IP address consists of two parts: a network number and a host number. The network number part of the IP address is assigned by a central authority and is unique throughout the Internet. The authority for assigning the host number part of the IP address resides with the organization which controls the network identified by the network number.

An IP address may also correspond to a host name in the form of <www.hostname.com>. The Domain Name System (DNS), one of the fundamental building blocks of the Internet, is responsible for providing translation between IP addresses and host names, as well as storing other information. DNS presents a hierarchical approach to the problem of organizing the name space of large computer networks. Each element of the hierarchy is referred to as a domain. A domain can be used to refer to a computer, act as a mail address, or just be a placeholder for subdomains. At the top of the hierarchy is the root domain, known simply as "." to DNS. Numerous subdomains can be placed underneath the root domain. For organization, subdomains can also be placed under other subdomains. Subdomains directly underneath the root domain are called top-level domains. Domains directly underneath top-level domains are called second-level domains, and so on. Any domain in the name space can be referred to by the domain names in its hierarchical path separated by dots.

Machines that store DNS information are referred to as nameservers. Other computers can query the nameservers to find out information about domains in the DNS. Each nameserver handles a specific part of the DNS. Through delegation, nameservers can allow other nameservers to handle parts of the DNS. Although DNS hierarchies can be set up for private networks, the vast majority of DNS use is by the giant hierarchy present on the Internet. Most of the use comes from name resolution, the use of DNS for determining the IP address of a machine so that communication can take place. Another important task of DNS on the Internet is reverse name resolution, or the translation of IP addresses back to domain names. Utilizing this functionality servers can determine and record the full domain name of machines connecting to them over the network.

Based on the development of current communication technology, with more and more consumer media choices and with the proliferation and the convergence of television, the internet and various other mediums, and with the growing connectivity of the Internet with wireless devices, consumers will be more and more able to customize their media streams or "channels" so that they are more and more tailored for the individual.

In the area of electronic commerce, manufacturers must provide information about their products to resellers, consumers, and others. Consumers need product information about available products to make informed buying choices. Resellers need product information to select, promote and support the products they distribute. Advertisers, product analysts, manufacturer's representatives, shippers, and others also need information about the goods with which they deal. While the advent of the World Wide Web has permitted manufacturers to make detailed, up-to-date product information available via the Internet, the information describing a specific product is often difficult to locate, particularly when the URL (uniform resource locator) of the manufacturer's website is not known. If the manufacturer does not have a website, the product will be virtually impossible to find on the internet.

The current state of the art of online catalogs is to use "shopping carts" to save items the user may be interested in purchasing for later consideration. Shopping carts are typically limited to the particular online product merchant's web site. Also, shopping carts can only be used online. Moreover, shopping carts currently in use today cannot be easily copied and shared between users.

The non-shopping environment of information exchange on the Internet may present other frustrating problems to a user. For example, the user interested in acquiring a jacket worn by Al Pacino in "Scarface" as shown in a picture recently posted in a web site, such as NBC.com, may never be able to locate any useful information about that jacket anywhere on the page.

While the sharing web page addresses has been a common practice for some time, it is not an efficient way for users to exchange and save information. When a saved web address is accessed, the user must navigate the web page to find the item of interest. Also, a web page provider may update the web page after the user has saved the address, frustrating the user's attempt to save information they considered important.

Therefore, there is a need to provide a more sophisticated information exchange system to the user, with greater ease of use and to provide a mechanism by which a user can easily save and maintain focused information on an item of their choice, without needing to repeatedly search a provider's web page. The present invention satisfies these needs.

SUMMARY OF THE INVENTION

The invention relates to a method of loading information onto a computer in the form of a digital capsule containing information about one of more aspects of a subject. Preferably, it can then be determined whether the information from the capsule should be updated when the subject is accessed on a user's computer, and, if so, the capsule information can be updated. In another embodiment, the subject comprises products offered for sale.

When the information is stored on a computer system, it preferably includes a mechanism for retrieving the information from the computer system. Advantageously, the capsule provides additional information about an aspect of the subject when the subject is accessed on the user's computer.

Another embodiment of the current invention relates to a method of modifying a software file, in which a capsule containing information about one or more aspects of a subject is created. The capsule is linked to a file containing a representation of the subject. Next, the contents of the file are displayed on a user's computer when a user desires to view the representation of the subject. Then, when the user selects to obtain more information about one or more aspects of the subject, the information in the capsule is preferably displayed on the user's computer. Advantageously, the user may optionally select to purchase the subject after viewing the capsule information. Preferably, the capsule is capable of being transmitted from the user's computer to another computer, possibly over the Internet.

The invention also relates to a method of displaying information from a capsule, in which the capsule is first located on a storage medium of a computer. The capsule contains information about one or more aspects of a subject, and this information is displayed. Preferably, identifying information may be sent about the capsule to another computer, which would then advantageously updates the capsule with the most current information about the aspects in the capsule. The storage medium of the computer would then be updated with the new capsule information, allowing the updated information to then be displayed.

Another embodiment of the invention further allows an instruction to be transmitted to another computer for performing an operation related to the subject. Preferably, this operation comprises causing a commercial transaction related to the subject to occur. Alternatively, the transmitted instruction may comprise identifying a supplier of the article.

The preferred transmitted instruction identifies an item or items related to the subject.

The invention also relates to a method of handling information about an article, in which a capsule identifier and associated capsule information about one or more aspects of an article are stored onto a computer. Next a capsule containing the capsule identifier and the capsule information is stored on the same or a different computer, and the capsule information is displayed on the computer. Advantageously, the capsule information may be updated with new information periodically. Preferably, the capsule information may be displayed on a web page, in which the capsule is loaded from the computer by selecting and copying an item from the web page.

Another embodiment of the current invention relates to a system for displaying and updating information. The system includes a computer with a processor connected to a display monitor. The processor is configured to operate viewer software to open and process a software capsule. The software capsule contains information about one or more aspects of a subject and an identifier that corresponds to the capsule. The viewer software is configured to locate capsules having the same identifier, display the information contained in the capsule, and obtain updated information on the subject from a computer.

Advantageously, the viewer software is further configured for storing the updated information of the subject in the capsule. The software capsule may be preferably accessed over a network, such as an internal communications network within a company or organization, or an external network, such as the Internet.

When the capsule data is stored on another computer, the viewer software is preferably configured for downloading the capsule from the other computer. This may be accomplished over the internal network or the Internet.

Another embodiment of the invention further allows that the software capsule is attached to a media file, and the viewer software is configured for enabling a user to update the software capsule when the media file is accessed. The media file may be an image file, a motion video file, a digital audio file, or any data in a digital format.

In accordance with another embodiment of the present invention a method of sharing information related to a subject among a plurality of computers including a server and a plurality of clients is provided. The method comprises the steps of opening and extracting information from a source file about the subject; creating at least one capsule containing the extracted information; loading the at least one capsule onto at least one of the plurality of computers; and communicating the at least one capsule over a communications network. Furthermore, the method includes the step of linguistically distilling the source file into a set of keywords and tag data. The distillation step includes the steps of indexing the source file. Moreover, the method also includes the step of managing the capsules by instantiating the capsule; notifying the plurality of computers or the server about the capsule changes; linking the capsules, thereby creating molecules; executing queries to search for capsules; and creating patterns among capsules, thereby exploring capsule relationships. The capsule information can also be encrypted on the server.

In accordance with yet another embodiment of the present invention, a capsule for enabling computers to share information related to a subject is provided. The capsule includes data extracted from a source file about the subject and reference information directing to the source file. The data can include a list of keywords representing the content of the source file and tag information of the source file. In addition, the capsule can be linked to another capsule, thereby creating a molecule. The capsule can be stored on a server and communicated to a plurality of computers. Also, the capsule can be provided with an expiration date after which the capsule information is no longer available.

DETAILED DESCRIPTION OF THE PREFERRED EMBODIMENTS

Figure 1A:
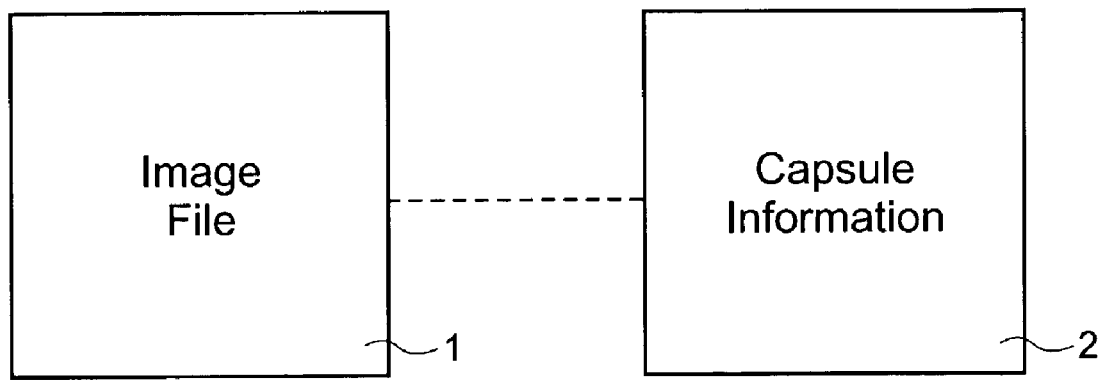
FIGS. 1a and 1b depict an image file associated with capsule information in accordance with a preferred embodiment of the current invention.

The present invention relates generally to digital media information exchange. In particular, and without limitation, the present invention relates to linking of a capsule of information to media files in a manner which allows for a viewer to access updated information easily. While preferred embodiments are described herein the realm of electronic commerce, those of ordinary skill in the art will appreciate that the present invention is not limited to use in transactions between a consumer and a merchant, and may be used within any type of application where exchange of digital media information is essential. For example, the present invention provides a means for organizing diverse data acquired from one or more Internet sources into a single, easily accessible, and intuitive management system. Moreover, for the data author, the present invention provides a link for tracking the distribution of that data and forwarding supplemental information or updates to the original data set.

For purposes of example only and not to limit the scope of the claims, the present invention will be described as it applies to retail consumer web transactions. One of ordinary skill in the art would recognize and understand the principles utilized in this embodiment and their utility for other applications.

In accordance with a preferred embodiment of the invention, still and motion images and audio, as well as other media content may be linked with further information pertaining to the media content. As an example, a merchant may post an image of a garment for sale on a web site. A user of the web site could then select the picture of the garment, preferably using a pointing device, such as a mouse. The user would then be provided with further information regarding the garment. Advantageously, the information may be provided immediately to the user, even if the user is no longer "online". This may be accomplished by the use of information capsules linked to the media content file.

Capsules

The terms "capsule", "information capsule", "capsule data" and "capsule information" are used somewhat interchangeably herein. A capsule is a transferable electronic file that initially includes information about an object or topic of interest. The information contained in the capsule generally pertains to items within a file to which the capsule is linked. The linked file preferably includes some media content, and/or information regarding the linked file itself. As an example, a file containing an image of a garment may be linked to an information capsule containing text, graphic or even voice data about the garment. Alternatively, an audio file, such as one containing digitized audio of a song (e.g., MP3), may be linked to an information capsule containing information regarding the recording artist and musicians, as well as purchase information for the song. Web links to facilitate purchase of the song or album may also be provided.

Similarly, the term "image file" as used herein generally includes any digital image, compressed or not. Also, a motion video, audio file, or other type of file may be used in most all instances herein where "image file" is mentioned without deviating from the current invention.

Information contained in a capsule for a particular product may include but is not limited to:

Product name;
Product description;
Product category/sub category;
Product UPC code(s)/multiple for sizes and colors;
Link to manufacturer web site;
Link to manufacturer product information page;
Keywords (for use in searching and matching promotions);
Image link(s) (for to view additional images of the product);
Link to retailer web site;
Link to retailer product purchase web site;
Listing of retailer brick and mortar locations (retail locations for the product);
Ensemble products (related products);
Date and time of most recent update to the capsule information
Expiration date of the capsule information; and
Custom fields.

Each of these items may take alternative forms. For example, "image links" may be the actual name of image files stored locally with the capsule, or they may be web site links with a single image or image galleries. Alternatively, depending on the implementation of a participating merchant web site, as further described below, the "image links" may be a simple identification number, which indexes a listing of image files, and from which merchant provided software is able to determine the proper image to link to.

Likewise, a system using capsules may implement them in many different ways, several of which are described herein. As an example, a capsule may reside on a web page and be linked to an image file by associating the image file with the web page. This may be accomplished by simply placing a web address within the header of an image file.

Linking Capsules to Images

A capsule may be linked with an image file in several ways. It is important that the browser be enabled to access the capsule data via its link with the image file (in the case of images presented to the user over a web site via a browser). This may be accomplished either by use of a special-purpose browser, or using a common browser (such as Microsoft Internet Explorer™ or the Netscape Navigator™) in combination with proper website design. Proper website design can include using a module and code provided by a capsule administrator, as described below, or HTML and/or Java scripting. Of course, the image and capsule may be stored locally (on the user's computer) and accessed entirely offline.

FIG. 1a is a depiction of an image file associated with capsule information. There are many ways to accomplish such an association. As an example, the image file 1 may have an image filename and filename extension, and the capsule information 2 may be stored in a separate file with a similar filename but different filename extension. An image file 1 with a filename of "jacket.jpg" would preferably be associated with capsule information 2 stored in a file with a filename of "jacket.lcf". Here, the filename provides the linkage while the filename extensions (".jpg" and ".lcf") indicate that one file is the image (preferably a JPEG image, hence the ".jpg") while the other contains the capsule information 2.

It is also possible for the image file 1 and the capsule information 2 to be linked using methodologies other than changing the filename extension. One example is the use of a mapping algorithm capable of generating a unique filename from another filename, and reversing the process. Such algorithms are well known to those of ordinary skill in the arts of mathematics and data encryption. Using such an algorithm, an image file 1 with a filename like "jacket.jpg" might cause the generation of a filename such as "qwertylk.kjh" into which the capsule information 2 may be placed. Reversing the algorithm and applying it to "qwertylk.kjh" would yield the original filename of the image file 1, "jacket.jpg".

Another method of linking the image file 1 with the correct capsule information 2 is through the use of a cross-reference listing, preferably maintained by the capsule administrator or information (e.g., product or data) provider (i.e., a product merchant), both of which will be described in detail below. In this scenario, when the user selects the image, the web page (preferably controlled by the information provider) invokes code to retrieve the capsule information 2. This code may be built into the browser or other user viewing software or it preferably may be HTML, XML, or JAVA scripting language provided by either the information provider or the capsule administrator. It may return the name of the file into which the capsule information 2 has been placed, or it could possibly return the capsule information directly.

Figure 1B:
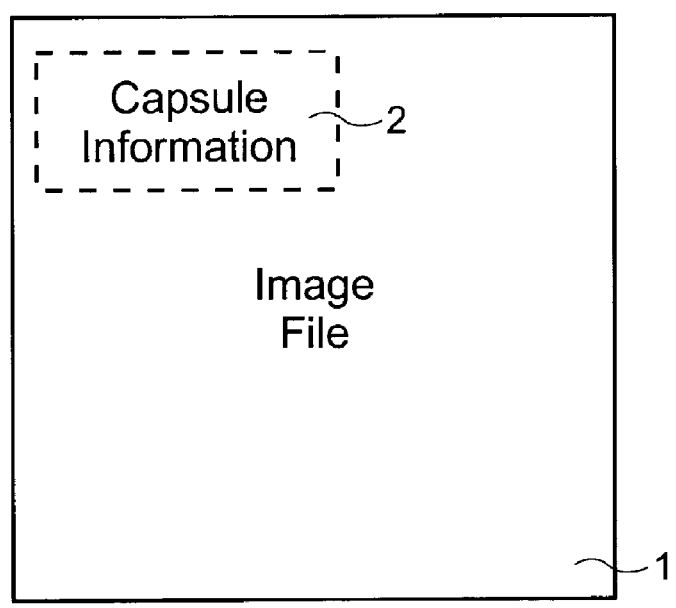
Figure 2:
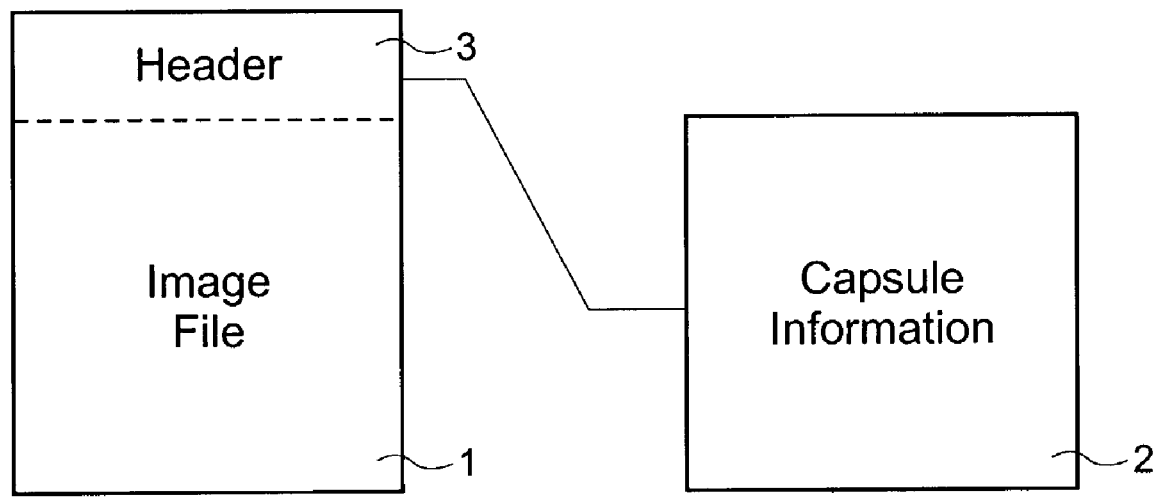
FIG. 2 depicts an image file associated with capsule information using the header of the image file, in accordance with a preferred embodiment of the current invention.

FIG. 1*b* is a depiction of an image file into which capsule information has been inserted. As an example, if the capsule information 2 is small, in one embodiment as small as the address for a web site, the capsule information can be stored in otherwise unused storage space that image files tend to have, usually near the beginning of the image file. Alternatively, a specialized file format may be created by the capsule administrator or the information provider, in which the capsule information 2 is inserted into the image file 1 at a predetermined location and by a known process. Later, when the image file 1 is to be displayed, the capsule information 2 is removed from the image file 1, stored in a computer memory, along with a memory linkage between the image and the capsule information 2. If the user then selects the image, the capsule information is then retrieved using the memory linkage.

The image file 1 and capsule information 2 may also be linked via the image file's file or image header 3. Many image formats, such as bitmap and JPEG as well as most others, include a file or image header 3. It should be noted that file headers and image headers, although technically different, often contain a similar type of information. As used herein, "file header" and "image header" may be used interchangeably without changing the meaning or scope of the invention, as will be apparent to those of ordinary skill in the arts of file and image structure and computer science.

Headers 3 often contain information such as file size, file checksum (a value generated from the binary data of the file, appended to the end of the file and checked after a transfer of the file to insure that the transfer was lossless), image dimensions, color palette, etc. Often, the header 3 includes unused space, which may preferably be used to store linkage data to the capsule information 2.

For example, the image file header 3 may contain the name of a file containing the capsule information 2. When the image is loaded for display to the user, the displaying software (preferably a browser running the information provider's or capsule administrator's HTML, XML, or Java code) can read the capsule information filename stored in the file header 3 and save it in the computer's memory. When the user selects the image, the capsule information filename is retrieved from the computer's memory, the referenced file is then opened and displayed to the user.

Alternatively, other indicia of capsule information 2 identification may be stored in an image file header 3. The indicia may be an identification code of the capsule information in a system that supports retrieving the capsule information 2 using such a code. For example, when the information provider is a product merchant who has a web based catalog of clothing, a clothing product code may be stored within each image header 3. When the user selects a particular image, the associated product code is retrieved from its header 3. This product code may then be used by appropriate product merchant and/or capsule administrator software to retrieve and present the correct capsule information 2 to the user.

Another advantage of the current invention is that capsule information 2 may be accessed either locally or over the Internet (online). Local access of capsule information 2 uses the capsule information associated with the image file 1. An example of this type use of capsule information 2 is when a user selects an image file 1 and views the capsule information 2 as initially provided with the image file 1. Often this offline information viewing is sufficient without update, such as when the user is interested in general product information. However, if the user is interested in current information, such as current price and availability of a product, the capsule information 2 may be viewed online. There are many obvious advantages to allowing the updating of capsule information 2 online. Noticeably, the user may be appraised of current price, availability, brick-and-mortar (physical store) locations and hours, special promotional offers, updates to purchasing links, as well as other available product accessories. The local capsule information 2 may also be updated.

In a general sense, when the information in the capsule is other than product description, such as biographical data on a certain topic of interest, the capsule information is updated each time the capsule is viewed online so that the most complete information is available each time the capsule is accessed by the user.

Figure 3:
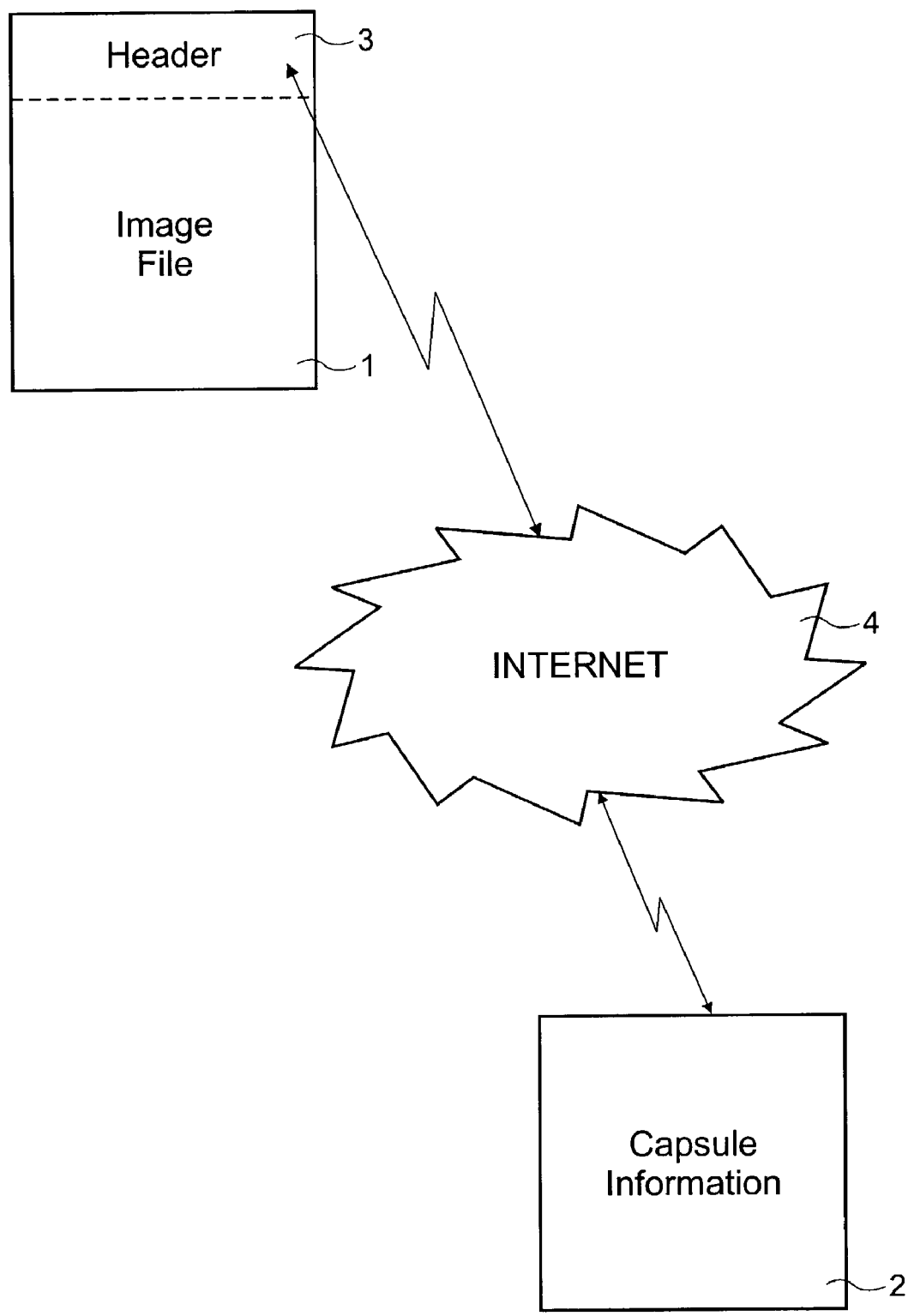
FIG. 3 depicts accessing capsule information over the Internet in accordance with a preferred embodiment of the current invention.

FIG. 3 is a depiction of accessing capsule information 2 over the Internet 4. An image file 1 with a file header 3 is depicted. Henceforth, depictions of image files 1 will include file headers 3, although any of the linkage methodologies with varying image file 1 formats as mentioned above may be used. Accessing capsule information 2 over the Internet 4 parallels the process of accessing capsule information 2 locally. For example, the header 3 of the image file 1 might contain product, data and/or web site identifiers. When the user selects the image, either a modified browser or a standard browser running either the information provider's, product merchant's or capsule administrator's script (HTML, XML, or JAVA, for example) extracts the linkage information from the image file header 3 (or other linkage technique described above). The linkage information is then used to access the capsule information 2 over the Internet. The "Internet", as used herein, may include any communications network, whether private or public, which can be accessed over telephone lines or by wireless transmitters and receivers.

As previously mentioned, capsule information 2 may also be linked to an audio file or a motion video. Motion video includes all digitized video, whether compressed or not. MPEG is a common video format, although the current invention is applicable to other video compression formats. MPEG will be used herein as representative of any video format.

MPEG stands for Moving Pictures Experts Group. It is a group of experts in the field of motion video compression who create and maintain standards and file formats for digital video. There are several existing MPEG video formats, and there is a currently emerging new MPEG standard as well ("MPEG-4"). The discussion herein generally applies to all existing MPEG standards, as well as other standards and compression file formats not mentioned. A special discussion of MPEG-4 and emerging standards and their relevance to the current invention is included below.

Figure 4:
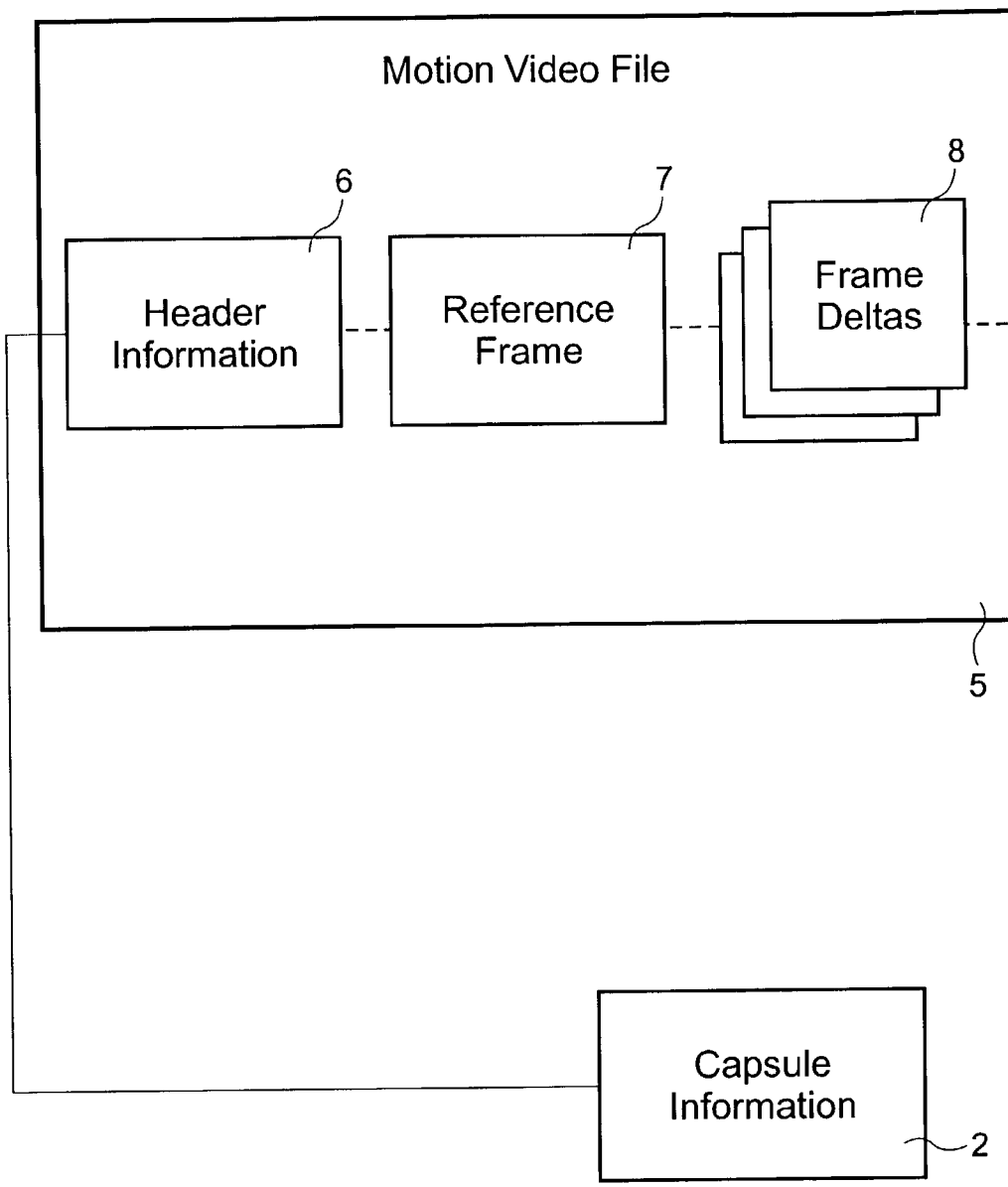
FIG. 4 depicts a typical MPEG video file and related capsule information in accordance with a preferred embodiment of the current invention.

A typical MPEG video file 5 and related capsule information 2 are depicted in FIG. 4. An MPEG video file 4 includes substructures such as file header information 6, one or more reference frames 7, and frame deltas 8. File header information 6 typically includes such information as image height and width, aspect ratio, color palette information, etc. It also frequently includes unused space, which may be used to store a link to capsule information 2 in a manner similar to that used with image files. Also similarly to image files, the linkage between a motion video file 5 and capsule information 2 may be by another mechanism, such as filename transforms, filename extensions, etc., as mentioned for image files above.

Motion video files typically encode frames (or fields) of video. To facilitate compression, frames (or fields) of video are usually encoded by first compressing a full reference frame (or field) 7, and then compressing a plurality of frame (or field) deltas 8. Thereafter, reference frames 7 are encoded periodically or upon changes of scene (when a large area of the frame has changed).

Linear video media, such as VHS tape, may also be linked to information capsules. In this case, the video player would preferably be controlled by a computer and linkage data and capsules would be available to the computer as well. The user would preferably select the video sequence to display using a pointing device, or even a television remote.

Figure 5:
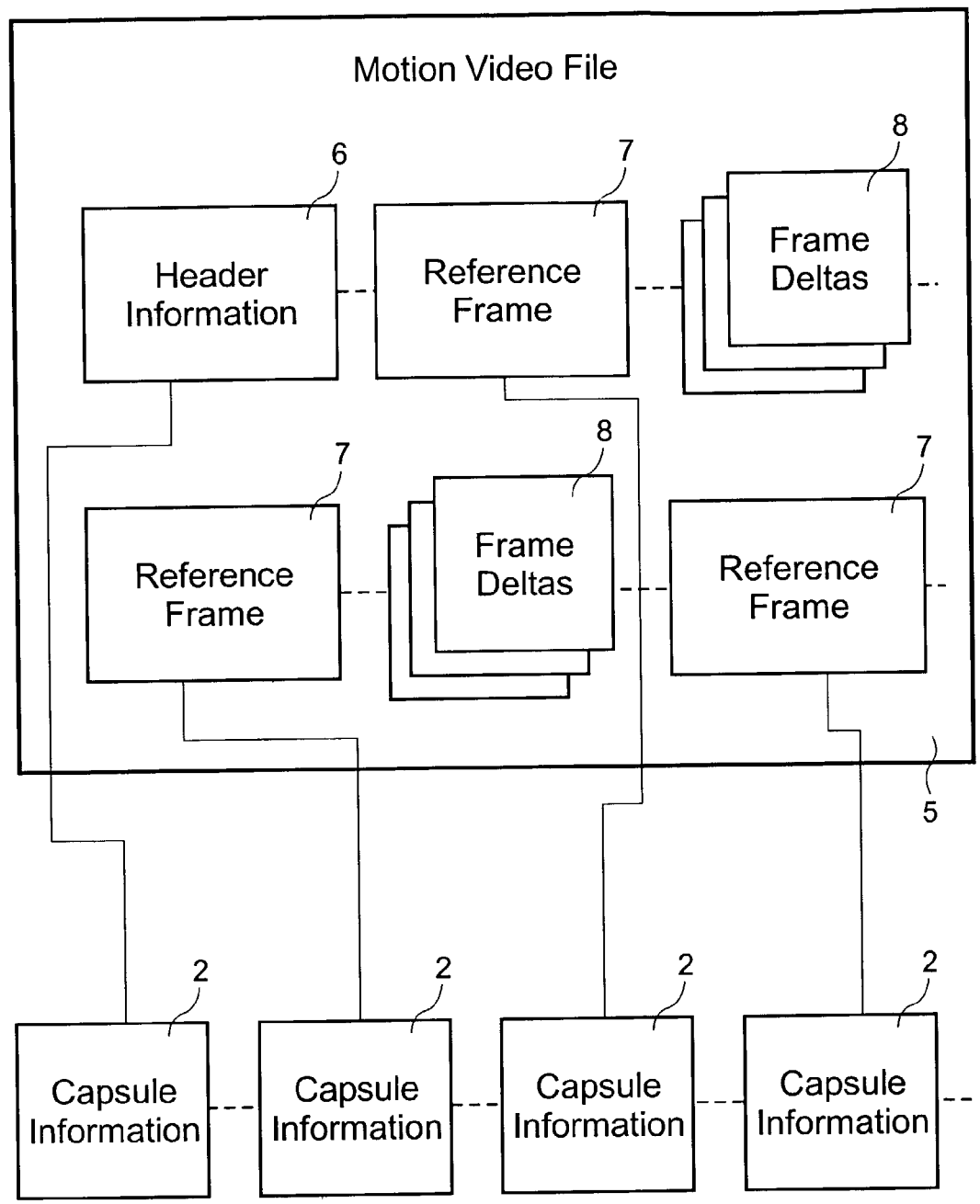
FIG. 5 depicts the linking of different capsule information to each reference frame of a motion video in accordance with a preferred embodiment of the current invention.

FIG. 5 depicts another advantage of the current invention, in which different capsule information 2 may be linked to each reference frame 7 of a motion video file 5. This may be accomplished in one of several ways. First, the header information 6 of the video file 5 may include time-based codes to link to different capsule information 2 depending on the video time elapsed at which the user selected the video image. For example, a video file may contain a fashion show. The user may view the video, observing the modeling of several garments, and then see one they are interested in. At this point they select the video (usually by pointing and clicking, as described above). The elapsed time is noted and the header information 6 is preferably examined to determine which link to capsule information 2 to use based on the elapsed time. The capsule information is then retrieved and presented to the user (during which time the motion video is preferably paused), and it preferably contains information on the garment of interest to the user.

Alternatively, each reference frame 7 may contain a link to capsule information 2 analogous to the link to capsule information 2 contained in an image file, as described above. In this embodiment, when the user selects the motion video, the link of the last reference frame is invoked to access the capsule information 2. As an example, when the user views a video sequence, each time a reference frame is encountered by the video decompression and rendering software, the capsule information 2 of the reference frame is loaded into the computer memory. When the user selects the video, the current capsule information 2 of the computer memory is accessed. Thus, the user may be unaware of the procedure used to reference the correct capsule information 2, and the experience is similar to that previously described when viewing the modeling of several garments.

Figure 6:
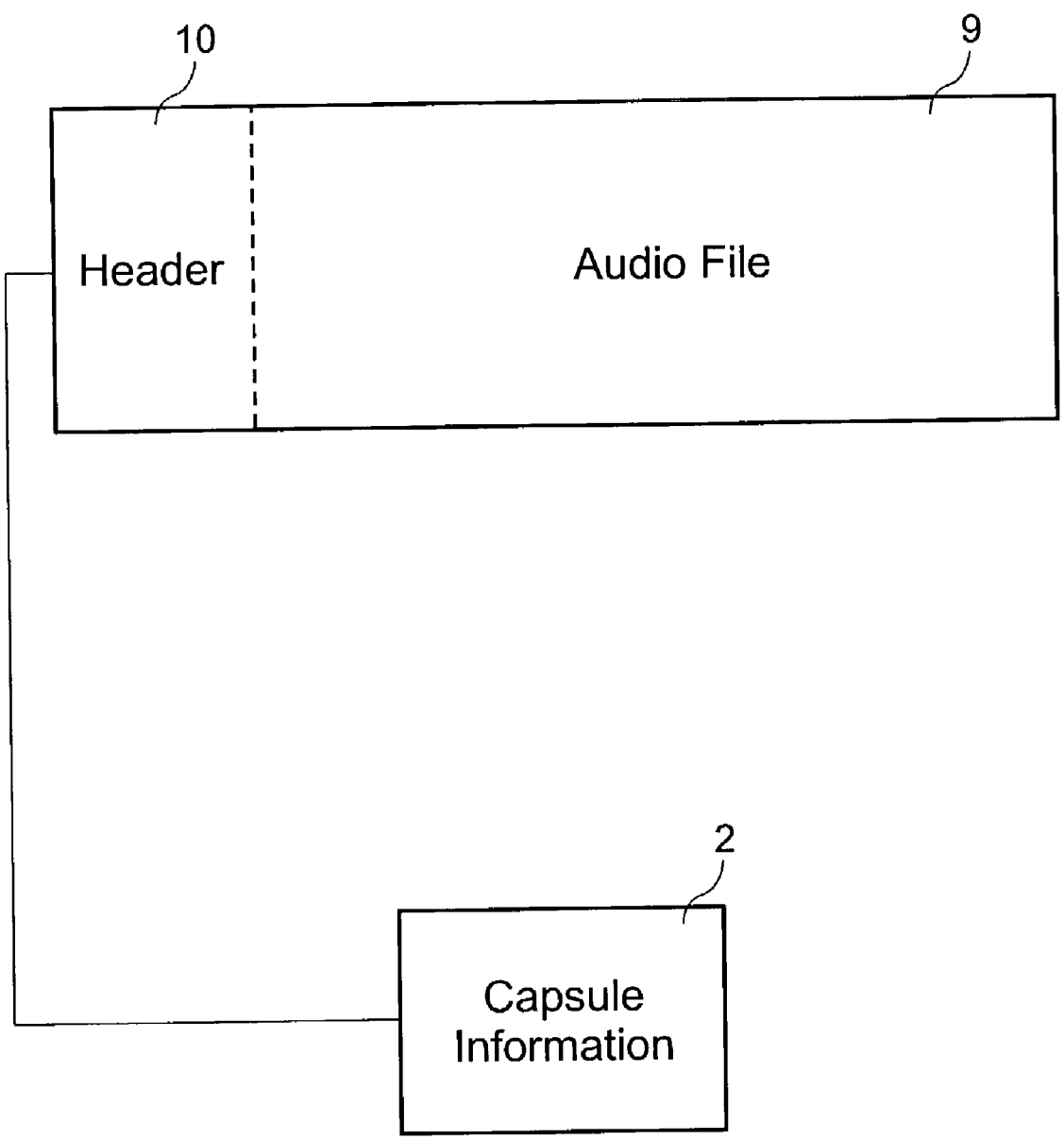
FIG. 6 depicts an audio file linked to capsule information in accordance with a preferred embodiment of the current invention.

As depicted in FIG. 6, digital audio files 9 also typically include a header 10, which may similarly be used to link capsule information 2 to the audio file. For example, unused storage space in an audio file header 10 may store the name of a file containing capsule information 2. Likewise, the audio file header 10 may contain other indicia of identification for the capsule information 2, such as an identification number, which the modified browser or product merchant or capsule administrator software (hereinafter referred to as "viewing software") is able to use. Also, an additional track may be added to the audio to insert broadcast content.

Audio file 9 access is somewhat different from image and video access. Rather than viewing the audio, a user typically listens to audio, although a representation of the audio may be viewed visually. For example, a user presented with a listing of songs may view the title of the song on a monitor. The user may desire to view the capsule information 2 without actually listening to the song. The user may, however, desire to hear the displayed title prior to viewing the capsule information 2. For simplification, both user actions are herein referred to as "viewing" the audio.

The audio file 9 and capsule information 2 may also be linked without the use of a header, by the use of file naming methodologies as described above. They also may be linked by use of a cross-reference listing maintained by the viewing software. In this case, the viewing software maintains a table with two columns. The first column is the filename of the audio files 9 available to the user. The second column contains a reference to the capsule information 2 for that audio file 9. When the user selects the audio file, as described above, the viewing software finds the selected audio file 9 in the first column and extracts the corresponding link to capsule information 2 from the second column. This method is similar to the resolution of DNS entries for an Internet address.

Capsule Sharing

Online users may store capsule information locally. For example, if a user has been shopping on an online product merchant's web site and has found a garment they want more information on, the user may access the capsule information linked to the image of the garment. Upon viewing the capsule information (or even without viewing it), the user may decide they do not want to proceed to a purchase immediately, but wish to save the capsule information for later, maybe even offline, review. The same is true when the capsule information is of another topic of interest.

The procedure for saving the capsule for later review is similar to other downloads, except that the live capsule of the invention is periodically updated automatically. Thus, information capsules can be easily saved by the user. Later, when the user opens the capsule information, the information may be viewed and, if the user is online, updated without user intervention. Another advantage of the current invention is the ability of users to copy and share capsules with one another without needing to again logon to a product merchant or other web site. For example, if User 1 has saved a file with capsule information on a jacket they might want to buy, User 1 could send the file with capsule information to User 2, who would then be able to view the capsule information using the viewing software.

Likewise, in a preferred embodiment, a user on one computer can access a capsule stored on another computer. Thus, if User 1 wanted to view capsule information stored in a capsule on User 2's computer, User 1 may do so. This may be facilitated by User 2 sharing their storage space out onto a communications network that User 1 has access to.

System Using Capsules

Figure 7:
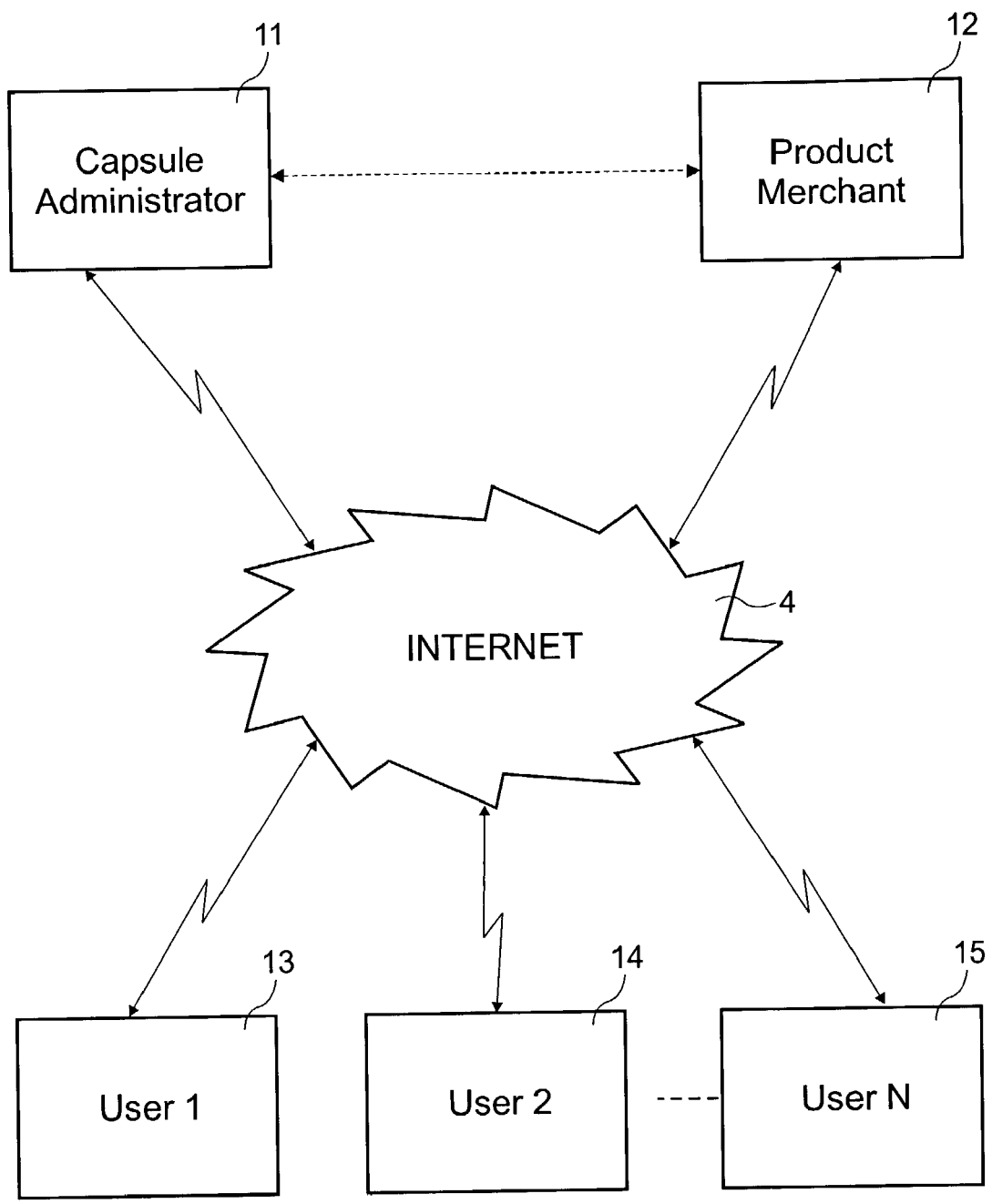
FIG. 7 depicts a system using capsules in accordance with a preferred embodiment of the current invention.

An example of a system using capsules according to an embodiment of the current invention is presented in FIG. 7. Here, a capsule administrator 11 and product merchant 12 work together to create information capsules for products offered by the product merchant 12, (see "Capsule Creation," below). The interaction between the capsule administrator 11 and product merchant 12 may be through the Internet 4 (with appropriate considerations for security) and/or through a secured private or semi-private communications channel. Hereinafter, this will be referred to as the "product merchant-capsule administrator business model".

Users 13, 14, 15 may access the product merchant 12 web site via the Internet 4, to download and view product images and download and view capsule information. They would also preferably download the viewing software from the product merchant 12, although they may obtain the viewing software from other sources as well. For example, viewing software may be distributed free of charge on a CDROM attached to a fashion magazine as a way of promoting or advertising a product or product merchant 12. Also, the viewing software may be distributed over the Internet 4 free of charge in an advertisement for the product. Another method of distributing viewing software would be to attach it to the first capsule a user downloads, and modify the downloaded capsule to become self-extracting and execute an installation of the viewing software. Techniques for software distribution are numerous and well known to those of ordinary skill in the art.

Additionally, users 13, 14, 15 may share and copy information capsules from one to another, using the Internet 4, email (not shown), or any other means of peer-to-peer communication (such as trading floppy diskettes). Once a user accesses an information capsule using viewing software, the information capsule may be updated automatically (if the user is online). Alternatively, the product merchant or other information provider can send a notification to user when the user is online that the information in the capsule is in need of an update.

Capsule Creation

In accordance with an embodiment of the present invention, a capsule is created when an application such as, for example, the Encapsulator linguistically distills a source document into a set of keywords and tag data. The collection of source document reference, index reference (if applicable), core tag information, and linguistic keywords comprise the capsule.

The source document can reside in a database, a file system, or any other data store that has a consistent access mechanism. The flow of document data between the source document and a linguistics engine responsible for distillation is enabled by a connector. The linguistics engine can be a software application that performs the two types of distillation. Multiple connectors are installed for multiple document source types and source locations. The connector provides a high-level, consistent access interface to the varied source of data. The connector also creates the core tag information, including document source reference, author, document type, primary object.

In a preferred embodiment, the linguistics engine performs two stages of distillation. The first state is an indexing stage, which is an indexing of the source document, removing common words and weighing important words. This index can be made persistent if the source data owner elects this option. The owner can also secure the index in the same way as the source document. The value of this index is realized during the analysis phase. Once a capsule is identified as relevant the index can provide potentially important information quicker than the source document.

The second stage of the encapsulation process is keyword distillation. By using the index created in the first stage the data is distilled into a much smaller set of keywords that represent the content of the source document. This is done through synonyms, meaning, and word patterns. For example, it might distill the indexed words "first base", "pitcher", "hot dog", and "coach" into a single keyword of "baseball". The keywords are weighted to indicate their importance and relevance to the source document. Keyword distillation is performed when queries are run to ensure that a match will be made.

At the end of the distillation process, the Encapsulator stores the resulting data on the capsule server. If there are multiple capsule servers, a single connector is associated with a single server. For example, a single data source will result in a set of capsules on the same server. Multiple data sources can be fed to a single capsule server; however, for security reasons, capsule servers can be preferably separated.

In accordance with another embodiment of the present invention, a client-side organizing application such as, for example, the capsule Organizer, allows the user to manage and manipulate capsules. This application supports the set of operations that an analyst can perform with a capsule, including instantiation, notification, linking (molecules), queries, patterns, and exploring capsule relationships.

The desktop portion of a capsule is a thin client that exploits the network and user interface components already available on analyst workstations and which are well known in the art. The deployment of this client varies by platform. In a Windows environment, for example, the client can be distributed as an ActiveX component. In a UNIX environment it can be a downloadable client. In all other platforms a subset of capsule functionality can be available via a browser interface.

The Capsule is created when the Encapsulator distills the source document as described above. A client can then put an instance of that capsule into their desktop capsule Organizer. This instance points to the server-based capsule and allows the user to perform additional operations and receive notifications. Preferably, users can perform a variety of operations with their capsule instances. They may first seek out core capsules that are relevant to their task at hand. After some exploration of existing links to these capsules, as well as queries and patterns that have been published by others, the user may then create one or more QueryCapsule. QueryCapsules allow users to seek out broader information, while at the same time refining and narrowing the information that is returned. During this process, the user will create SetCapsules, which allow them to manage their work as they determine what information is important and related. While performing these operations, the user can receive and act upon notifications of newly published links, new documents, and new patterns. Finally, analysts can create PatternCapsules that they can use and publish to recognize future occurrences of similar and related information.

In accordance with an embodiment of the present invention, the capsule Organizer sends periodic requests to the capsule server(s) and receives information about any new activity. This activity can be a new link that includes an instantiated capsule, changes in the results of a QueryCapsule, or changes in the results of a PatternCapsule.

If there is a change, the capsule Organizer creates a notification flag. Depending on importance, this notification can be as non-intrusive as a change to the capsule icon (e.g., a flashing arrow). The notification might also be a pop-up message indicating what has changed, providing a pointer to the capsule affected and a description of what has changed.

Notifications can also be sent from the capsule server to anyone who has particular capsule instantiated. The message sender or administrator determines whether the notification appears as a change to the capsule icon or as a pop-up message.

In a preferred embodiment, the capsule Organizer allows analysts to store and manipulate the varied forms of capsules and to examine their relationships with other capsules. However, when initially performing some analysis, it might not yet be clear what those relationships are. By creating a SetCapsule, the analyst can maintain a collection of capsules without initially defining any relationships between them. This is an isolated capsule container or workspace. A user can have multiple SetCapsules, and can even publish these sets to encourage communication with others who might be working on the same or similar capsules, even though the relationship of the capsules in the set has yet to be determined.

Individual capsules provide value by themselves through their representation of source data in an easily consumable manner. Molecules provide the means to link individual capsules together. Molecules can be created manually or automatically. Analysts can create molecules using the capsule Organizer. Alternatively, molecules can be created automatically using agents.

If the user wants to link two capsules to create a molecular bond, they simply highlight the two capsules and select the molecule creation action. They are asked for some basic information about the relationship (to indicate the strength of the bond and to comment on it), and then the molecule is created. There is no limit on the number of molecular bonds a capsule can have.

After a molecule is created, anyone who has either of the two capsules in their capsule Organizer will be notified that a new link has been created. Optionally, a user can decide to keep the molecular bond private, in which case it is maintained only in the CapsuleSet.

To accelerate searching for information, an analyst can execute queries to return a set of capsules that match the criteria. Initially, the user might want to execute a query based on a single capsule. Such a query is simply looking for other capsules that have similar keywords and document types to the base capsule. The user can first create a SetCapsule to look at some of these returned capsules and then create molecules if any of the resulting capsules have direct relationships.

In accordance with another embodiment of the present invention, a more powerful tool is the QueryCapsule. This allows the user to take a set of keywords and apply logical operators. An initial QueryCapsule can be created from a capsule and then edited. When executed, a QueryCapsule returns a list of capsules that match the keyword expression defined in the QueryCapsule. If any of the returning capsules are of interest, they can be brought into a SetCapsule and be used for additional queries or Encapsulator prior to any matching to ensure that the same language rules are applied, thus improving the chances of an accurate match.

There are a number of turning parameters for a query, including:
  Threshold keyword strength
  Percentage keyword match (for the logical AND portions)
  Depth of molecular capsule inclusion and threshold bond strength
  Set, query, and pattern inclusion In addition, QueryCapsules can provide notification when the set of capsules being returned have changed based on user settings.

While a QueryCapsule applies logical operators to search elements, PatternCapsules enable operations on the result sets of queries. If performed against the same set of capsule data, the logical operators are typically part of the search. However, when going against multiple data sources or when looking for relationship across varying types of data, PatternCapsules are preferred.

By taking two or more QueryCapsules, identifying common elements in their resulting capsule lists (e.g., primary object, location, etc.), and then indicating an operation (e.g., union, intersection, etc.), a new result set is created. This operation can then be repeated with the new result set and additional QueryCapsules.

The end result is a series of queries representing a pattern—behavior, temporal, events. Often these are created after a pattern is recognized or has occurred. This pattern can be used to provide notification when additional information in its final result indicates a new match to the pattern. It can also be used to create new patterns based on a known one, to recognize events that have yet to happen. Thus, when such related events happen, the user is notified of a possible update to the capsule information.

The above mentioned tools coupled with capsule notification and molecules can help analysts recognize patterns early. They also help analysts recognize relationships between otherwise seemingly unrelated data.

As described above, there are a number of ways that capsules can relate to each other. The capsule Organizer provides a very simple way to navigate these relationships:
  Sets—Appearing to the user as directories, these are containers of capsules and can contain any capsules, QueryCapsules, and PatternCapsules. Sets can also contain additional SetCapsules. The user simply clicks on the SetCapsule container to view the contents.
  Molecules—The molecule icon indicates the presence of molecular bonds to a capsule. The user clicks on the molecule icon to view the capsules that have a direct relationship. They can continue to traverse through these molecular bonds, although the further they go, the less likely the resulting capsules are relevant to the original capsule (i.e., much like traversing a synonym tree). Thresholds for bond strength can be specified. They can click the Back button to revert on level.
  Queries—While the QueryCapsule is persistent, the result set is not. To execute a query, the user can click on the QueryCapsule to see the resulting capsule list. If there is a change in the result set from the last time the query ran, the notification icon appears. If the query is old and has not run in a while, an aged icon will appear. In this case, the user can re-run the query to see the new result set.

Patterns—Just like QueryCapsules, the pattern is persistent but the intermediate and final result sets are not. The same behavior and rules of a QueryCapsule apply to a PatternCapsule.

In accordance with one embodiment of the present invention, the capsule Organizer is the primary way of viewing and analyzing capsule information. To maintain system integrity and to share appropriate information, most of the data is stored on the capsule server. In addition, much of the execution of queries is performed on the server.

Capsules contain some flat information—e.g., tags, source reference, type—as well as a list of keywords. This information is stored in a few tables on the capsule server, and indexed based on all the information, including keywords.

When a client instantiates a capsule, the relevant information is tracked. This is primarily for the auditing, however it can also be used as a notification tool. Ongoing access to the capsule can also be tracked for auditing purposes.

A simple notification is a broadcast to everyone who has instantiated a specific capsule. This is done on the server through the administration tool by picking the capsule and indicating the notification. The notification will appear on the client as an icon or a pop-up message as discussed above.

Molecules represent links between capsules, and are stored as such. There are also attributes stored, including the type of link (manual or agent), strength of the molecular link (indicated by the creating user or calculated by the agent), and additional comments. These are stored in a series of tables.

Queries are similar to capsules with the exception that they do not represent a single document, and they provide for logical operations on the keywords. As such, queries are stored in a series of tables very similar to the capsules tables.

Patterns are a collection of queries with operations on the result sets. Generally, patterns are to molecules what queries are to capsules. Patterns are stored in a series of tables similar to the molecule tables.

In accordance with an another embodiment of the present invention, agents are implemented to look for highly relevant keyword matches across the multiple capsule types to automatically create molecular bonds. These bonds are by definition weaker than user-created molecular bonds, but they can provide connections between information that might take a user many days to find. By looking in the keyword table for matches across molecules, including keyword strength and relevancy thresholds, and including keyword match thresholds, agents can create molecular bonds without fully understanding the content. The keywords and the document tags create a polarity that the agents match up. Agents are tuned to the specific data, processing power, machine usage, and importance. Preferably, agents run within a single capsule server as well as across servers. The resulting bonds created by agents are stored in the same structures as manual bonds with a flag indicating an agent created them versus an analyst.

In a preferred embodiment, capsules can be destroyed for many reasons, including source document destruction, security, and relevance. When a capsule is destroyed, all subscriptions and relationships are also destroyed.

If a client deletes their capsule instance, this removes their reference to the capsule on the capsule server, but does not remove the capsule from the server or the source document. In this case, the capsule is removed from the capsule Organizer and the action is recorded in the audit log. The user is prompted whether or not to remove all references to this capsule that they have created and can indicate a subset of them.

If the source document is "destroyed" or, for security reasons, the source document can no longer be represented in a capsule, the capsule is destroyed. This is done by removing all content from the capsule, notifying all users that have instantiated the capsule, and breaking all links to this capsule. Because of the nature of the molecular bonds, the breaking of the links does not have a detrimental effect overall.

In contrast, if a capsule remains, but the security of the capsule changes (i.e., the server no longer publishes the capsule to other servers), then for users who have instantiated the capsule and can no longer access it, they have the same perception as if the source document was destroyed.

In accordance with an embodiment of the present invention, depending on the source data, a capsule can have an expiration date/time. For example, when the capsule contains information on a product that is on a special sale, the capsule can expire on the date that the sale ends. In addition, sets, queries, and patterns can have an expiration date/time. When these capsules expire, they are treated in the same manner as a source document being destroyed.

Merchant/Consumer Environment Embodiment

Figure 8:
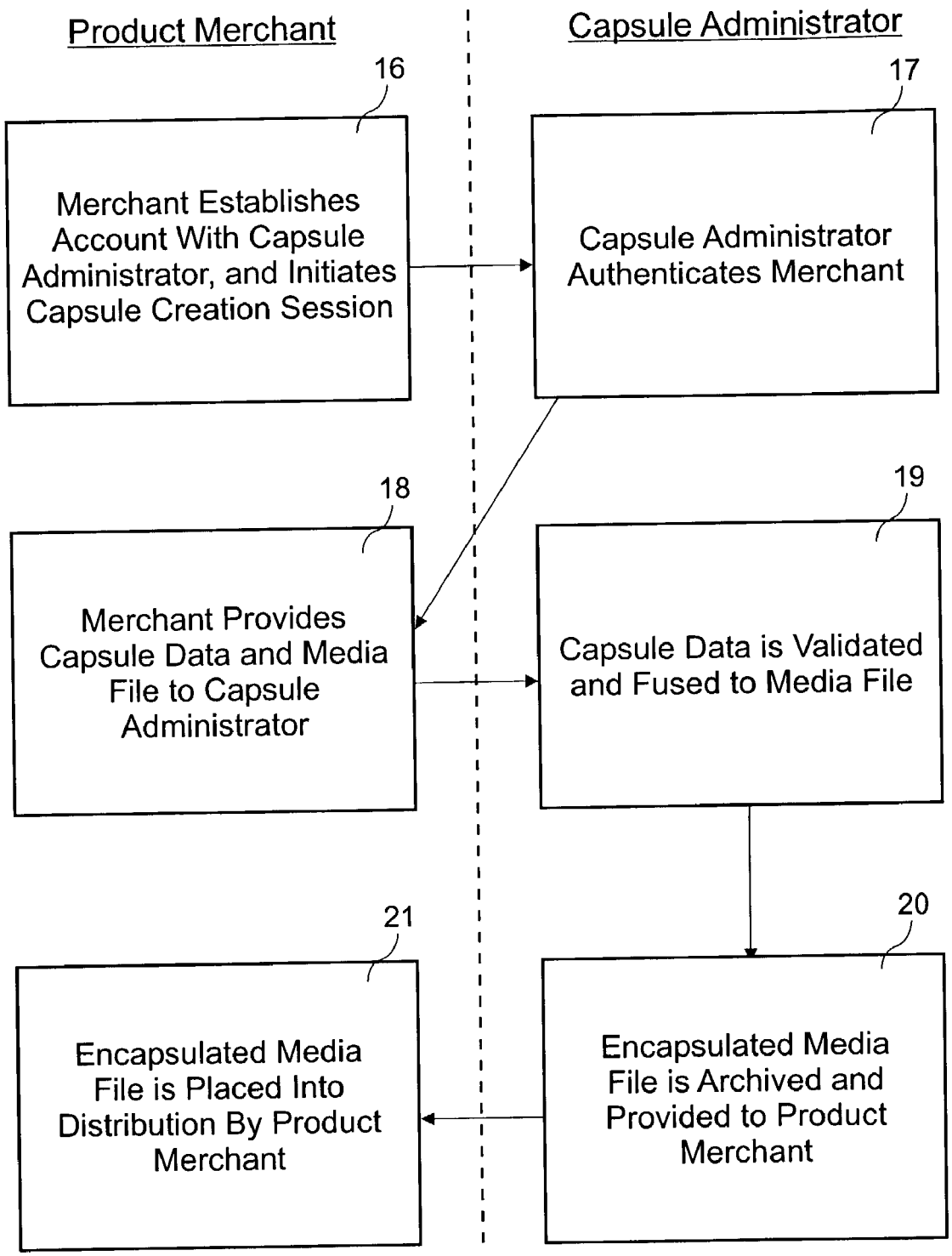
FIG. 8 is a flowchart of the process of creating capsule information in accordance with a preferred embodiment of the current invention.

In the preferred embodiment for the merchant/consumer environment, using a product merchant-capsule administrator business model, as previously mentioned, the process of creating capsule information is depicted in FIG. 8. The product merchant first establishes an account with the capsule administrator and initiates a capsule creation session 16 by logging on with the capsule administrator using this account. The product merchant and capsule administrator preferably reside on separate computer servers. If the product administrator already has an established account with the capsule administrator, they bypass the account establishment step. The capsule administrator next authenticates that the product merchant is beginning a session 17. The authentication step is when the capsule administrator verifies that the product merchant has provided the proper authenticating criteria, such as a user ID and password, and is thus an entity entitled to create or otherwise access capsule information.

Next, the product merchant provides the capsule data and a file containing the image, video, audio, etc. (henceforth, the "media file") to the capsule administrator 18. Then, the capsule data is validated and fused to the media file 19. The step of validation is the checking of predetermined fields of the capsule data for valid data. This is preferably done with the advice and consent of the product merchant. For example, the product merchant may ask the capsule administrator to insure that certain products are always cross-linked with other products. For example, ski boots can be linked with skis, poles, gloves, caps, ski goggles, etc. Other validations may be common sense, such as verifying that all prices are positive numbers, and insuring that all dates exist (i.e., no February 30th). Also, a product merchant may desire that the validation step be skipped entirely.

After validation, the step of fusing the capsule data to the media file creates an "encapsulated media file". This represents the media file and its linked capsule information. Use of the term "encapsulated media file" is not intended to imply that there is only one file at this point, merely that the media file and capsule data have been linked using one of the methodologies described herein. The encapsulated media file may also include an identification number assigned by the capsule administrator.

The encapsulated media file is then archived, or saved, by the capsule administrator and sent to the product merchant 20. The archival step is done to both create a record of activity done by the capsule administrator and to preserve a copy of the encapsulated media file in case of loss or data corruption at some future time. Moreover, the encapsulated media file may be used to facilitate future updates to the capsule data and/or media file, described below. Additionally, the capsule administrator advantageously can create and/or update a product capsule database, which may be used to store product capsule data in a easily-accessible manner. This product capsule database may itself be connected to the Internet or other communications network via backend software, and may even expose metatags for use by Internet search engines, thereby allowing another avenue of exposure of the encapsulated product to potential users.

Finally, the encapsulated media file may be placed into distribution by the product merchant 21. For example, the product merchant may place the encapsulated media file on its web site, ready for access by users as described above.

Alternative methodologies for building encapsulated media files from raw product merchant media files are also envisioned. For example, an automated program would advantageously be able to generate encapsulated media files from a multiplicity of possible product merchant media data formats, including those that are proprietary.

Updating Capsule Information

Figure 9:
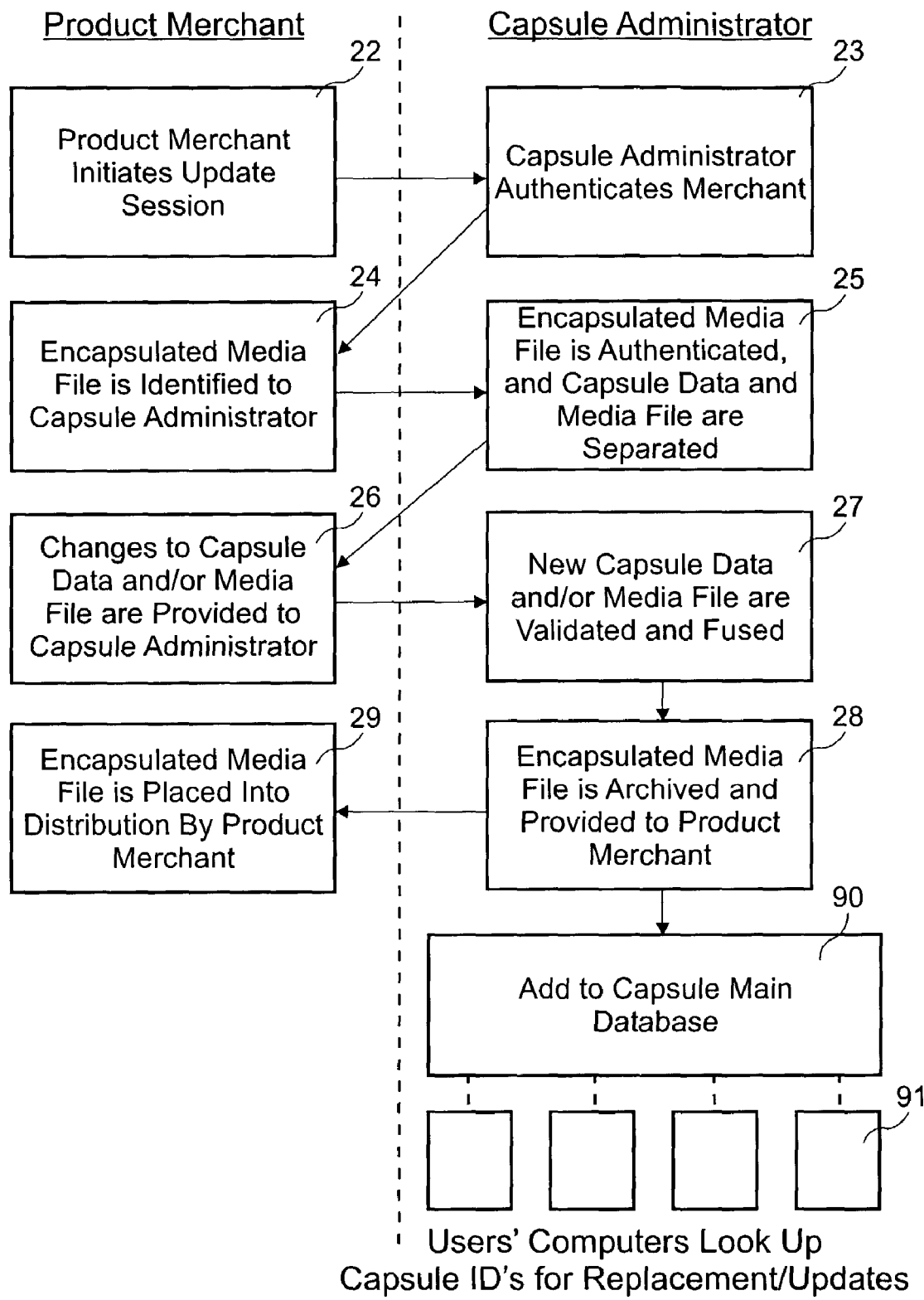
FIG. 9 is a flowchart of the process of updating capsule information in accordance with a preferred embodiment of the current invention.

FIG. 9 is a flowchart describing the process by which a product merchant may update the capsule information in an encapsulated media file, as initially prepared by the process described above. First, the product merchant initiates an update session with the capsule administrator 22.

This preferably involves logging on to the capsule administrator server. The capsule administrator then may authenticate the product merchant as authorized to perform updates to capsule information 23.

Next, the existing encapsulated media file is identified to the capsule administrator 24. The encapsulated media file may be identified in any of several ways. One such method of identification is by the use of the encapsulated media file identification number, which may be included and embedded within the capsule data itself during creation of the encapsulated media file. Many other methods of identifying the encapsulated media file to the capsule administrator exist, as one of ordinary skill in the art knows.

Then, the encapsulated media file may be authenticated by the capsule administrator by comparing it with a copy of itself stored by the capsule administrator, and the original capsule data and original media file may be separated from the encapsulated media file 25. This extra authentication step is optional, and may be skipped if the added security afforded is not needed or desired. The segregation of the original capsule data and original media file from the encapsulated media file is only one of several possible methods of recreating the original files. Another method would be for the capsule administrator to have stored a copy of the original media file and original capsule data during the prior creation process, when the encapsulated media file was archived.

Regardless of how the original files are accessed, the product merchant next provides the changed capsule data and/or media file to the capsule administrator 26. The capsule administrator may take several actions depending on the specific implementations, all of which result in the creation of a new encapsulated media file. For example, the capsule administrator may compare the original capsule data with the newly provided capsule data and compare the original media file with the newly provided media file. If both the new media file and new capsule data are different from the originals, the new capsule data and new media file may be validated (as in the creation process above) and fused to create a new encapsulated media file 27. Likewise, if the capsule data is changed but the media file is the same, the new capsule data may be validated and fused with the original media file to form the new encapsulated media file. Also, if the capsule data is unchanged but the media file is different, the original capsule data may be fused with the new media file to form the new encapsulated media file.

If the comparison process determines that neither the media file nor the capsule data have changed, the capsule administrator may signal the product merchant that no update is needed and the operation would be terminated. Otherwise, the newly created encapsulated media file is archived and provided to the product merchant 28.

The encapsulated media file may then be placed into the distribution stream by the product merchant 29, whereupon users may access the media and capsule information in accordance with other described aspects of the current invention.

Finally, the capsule administrator would preferably add information about the encapsulated media file to the capsule main database 90. This database is preferably keyed to and/or indexed by a capsule identification number, and may be advantageously implemented using commercially available database software. Ultimately, the users' computers would preferably be able to access the main capsule database, such as to update or replace capsule data 91.

Capsule Information Retrieval

Figure 10:
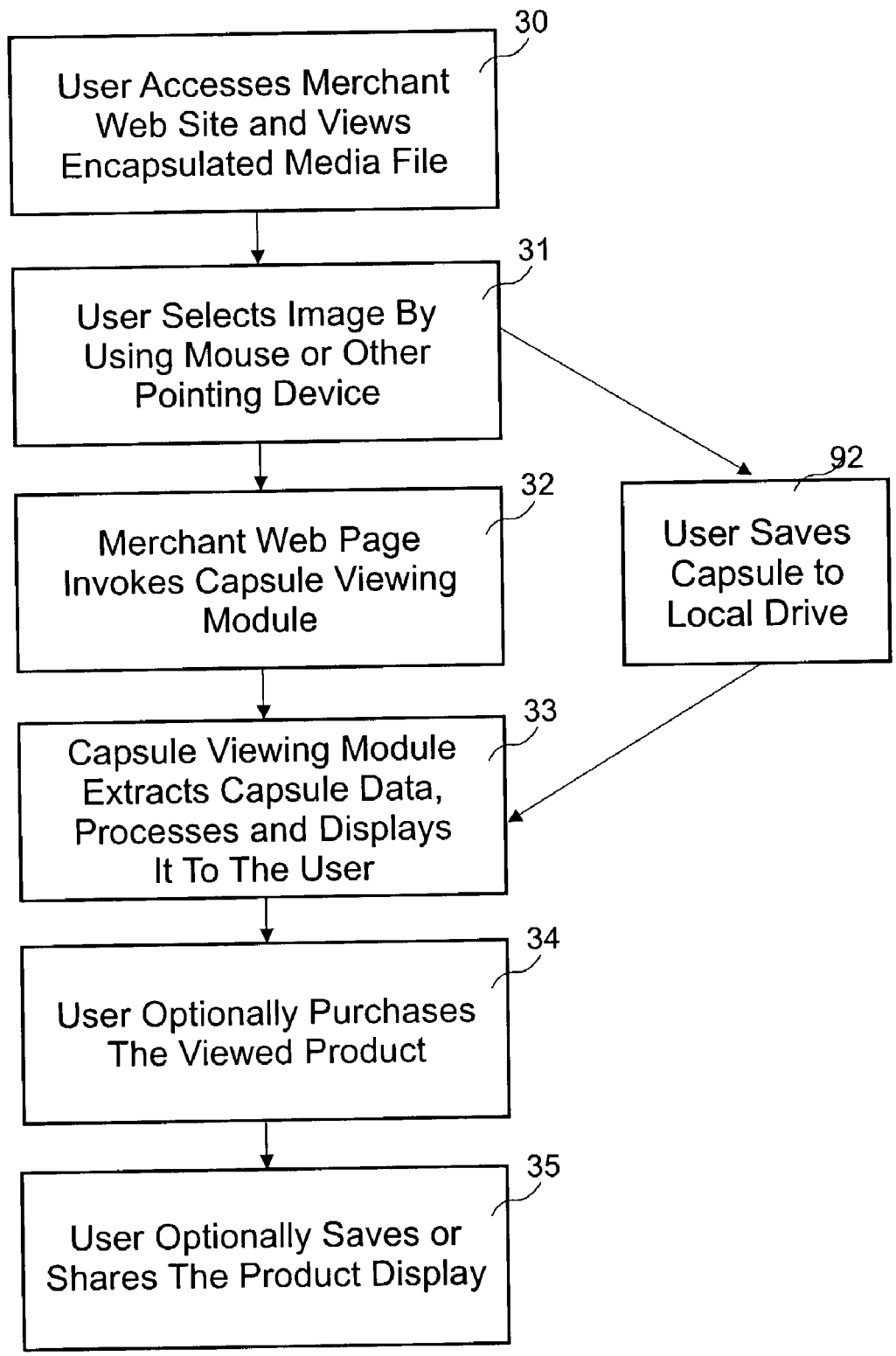
FIG. 10 is a flowchart of a typical session between a product merchant web site and a user in accordance with a preferred embodiment of the current invention.

FIG. 10 is a flowchart describing a typical session between a product merchant web site and a user. It assumes the user has received and loaded viewing software ("viewing module") and the media is an image. Of course, any media may be used and the viewing software nay take many forms, as described above.

First, the user accesses the merchant web site and views an encapsulated media file 30. The merchant web site may be set up for use with specialized browser software, or, preferably for use with a common Internet browser running a specialized HTML, XML or JAVA script. The media viewed by the user may be of the original image file with hidden links to the encapsulated media file. Advantageously, the merchant does not need to update or change their web site, and its appearance can remain unchanged, as if no capsules are present.

Whatever the arrangement of viewing software, ultimately the user selects an image (or video, or audio, etc.), preferably using a mouse or other pointing device 31. At this point, the merchant web site code would invoke capsule viewing module software 32, possibly provided by the capsule administrator. The capsule viewing module software may then extract the capsule data using the encapsulated media file, and display it to the user 33. Many arrangements of software can be used to retrieve and display the capsule information to the user. For example, the merchant may use a software module provided by the capsule administrator to extract capsule data from an encapsulated media file. The merchant's own web site software may then be used to render the capsule data onto the user's display monitor. Alternatively, the merchant may preferably download a software module, such as a JAVA script, onto the user's computer, and this downloaded script may be run to extract and display the capsule information.

Another embodiment of the invention allows the user to access the capsule information by displaying an informational tag, such as in response to a mouse or other pointing device moving over an encapsulated image. The user would then be able to select the informational tag, which would act to link the user to capsule information.

The user may select to save the capsule data on their local hard drive 92, before or after viewing the selected image. The capsule viewing module may then be invoked to extract, process and display capsule data at a later time 33.

The user may decide to purchase a product offered through the capsule information display 34. In this case, the product may be purchased from the merchant. Also, if the software module used to present the capsule information to the user is provided by the capsule administrator, the capsule administrator may charge a fee to the merchant (and/or to the user). Otherwise, other payment arrangements may be made between the merchant, capsule administrator and the user. For example, the merchant and capsule administrator could agree to share a percentage of the price paid for the product by the user to the merchant. Alternatively, the capsule administrator could handle the purchase transaction and take a cut of the sale price as its commission.

Whether or not the user proceeds to a purchase of the product, the capsule information may be saved by the user and/or shared by the user with another user 35. For example, the user may view capsule information on a jacket offered by the merchant, but want to get a friend's opinion before proceeding with a purchase. The user may then either save the capsule information to a disk file, or attach it to email and send it to their friend. Upon receipt, the friend may view the capsule information if they have viewing software. Alternatively, the process of creating a file containing capsule information can be used to append a small version of the viewing software to the file and making the file self-extracting and executing an installation of the viewing software.

Yet another possibility is for the file containing the capsule information to include a self-extracting message informing the user of an Internet location from where viewing software may be downloaded.

In another preferred embodiment of a file containing the capsule information, a mini browser is included to allow the capsule to be displayed on the user's computer, possibly even as a simple icon displaying price or other information. Selecting this icon would then invoke a full capsule viewer, if available, or download a full capsule viewer otherwise.

Additionally, the user may access the saved capsule information at any time. When the capsule information is accessed, the viewing software may check to see if an updated version of the capsule information is available (if the user is online). The viewing software may also use information in the capsule data to determine the frequency at which the capsule need to be checked for updates.

Capsule Viewer

Figure 11:
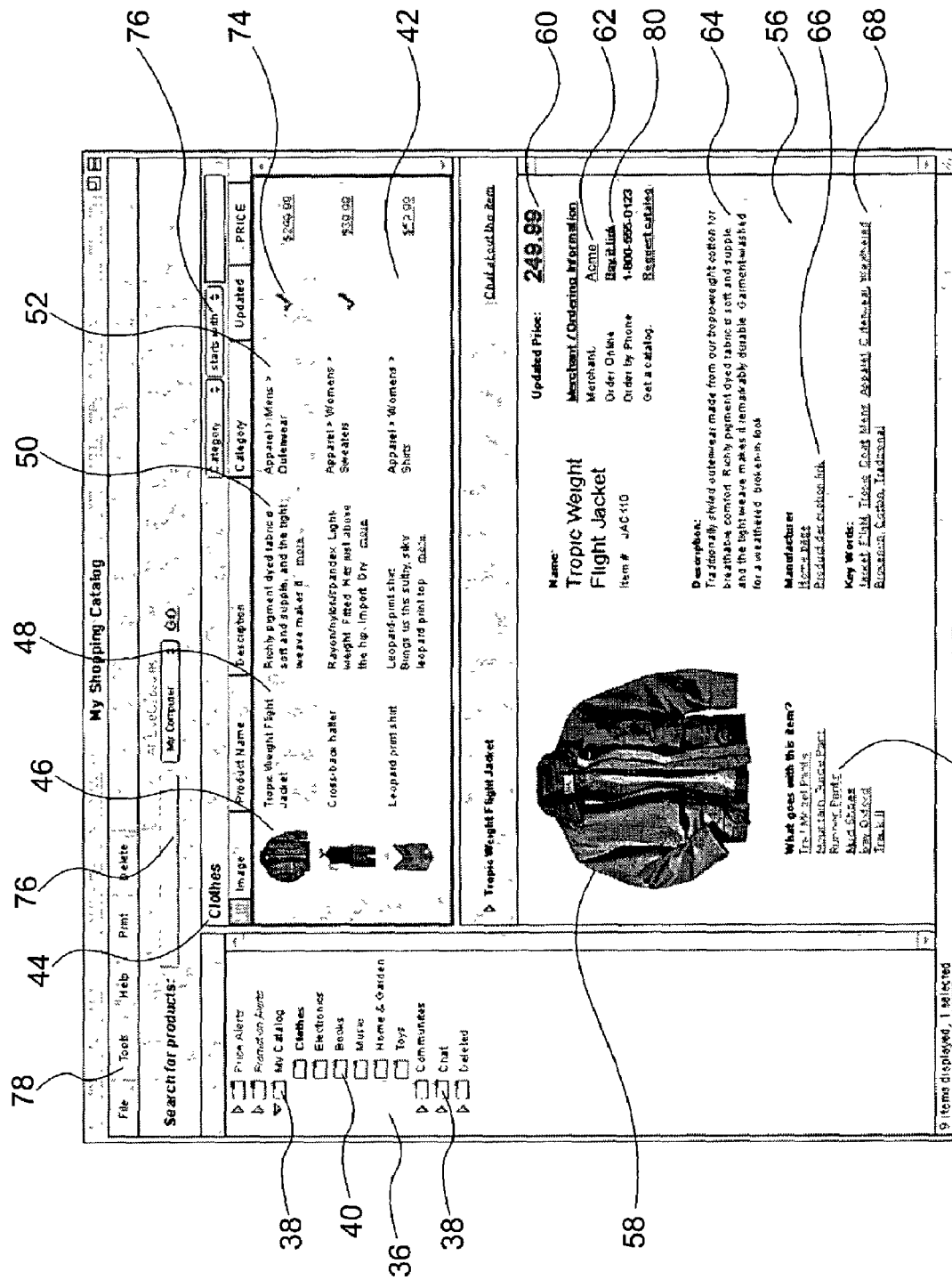
FIG. 11 shows an embodiment of a display of a capsule viewer of the current invention.

FIG. 11 depicts a capsule viewer in accordance with a preferred embodiment of the current invention. The interface and display is preferably configured for ease of operation for a user accustomed to typical applications for common operating systems, such as Windows® or MacOS® and preferably includes many standard interface features.

The preferred viewer display includes a directory display 36. The directory display 36 includes folders corresponding to several categories, including chatrooms and communities 38 and subclasses 40. The folders 38, 40 can be further divided into narrower classifications as many times as required.

The class folder 38 labeled "My Catalog" has been selected in the figure, and the subclass folders 40 are displayed. The classification of the capsules in loaded from the capsule directory 32 is preferably determined by the classification information contained within the capsules 28 themselves. The viewer displays folders that preferably correspond only to the capsules available to the user's computer.

When a user selects a folder 40, such as by clicking on the folder with the mouse cursor, information from the individual capsules displayed in a capsule listing zone 42. In the embodiment shown, the capsule listing zone is disposed separate from the directory display 36, but in another embodiment the capsule listing zone is disposed within the directory display, such as by listing the individual capsules beneath the corresponding classification folders for each capsule.

The preferred display zone 42 includes the classification name 44 of the capsules whose information is displayed therein. In the embodiment shown, an image 46 contained in each capsule is shown, along with the product name 48, a product description 50, a product category 52 which may also be selectable through an arrangement of the folders in the directory display 36, and information on promotions of the product 54. Other pieces of information on other aspects of the products can be displayed in addition or instead of the ones in the figure. The displayed information from three capsules is shown in the figure, but this number too can be varied.

The product description 50 displayed is an abbreviated version of the description information contained in the capsule. Selecting the link labeled "more" causes the viewer to bring up a display with preferably the entire description information.

Similarly, the promotion information 54 includes a link, which is labeled "yes" in the figure, the selection of which causes the viewer to display more of or the entire the promotion information from the capsule. Alternatively, the link labeled "yes" is a hyperlink to a promotion web page on a web page, such as the merchant's web page. The viewer preferably searches for the promotion information 54 in the capsule. If the promotion information field is empty, or if an indicator is present that indicates that there is no promotion to be displayed, the field in the listing zone is left blank. If detailed promotion information is found, the viewer preferably displays a simple link, such as the "yes" link shown. Alternatively, the capsule contains the name of any link to be displayed.

The viewer further allows the user to select one or more particular capsules for viewing in more detail. In the figure, viewer is displaying detailed information on top listed capsule from the listing zone 42, which is identified by the darker or different color background in the listing zone 42 about the displayed information from the selected capsule. The more detailed information is displayed in a detail area 56.

In the detail area 56, a larger image 58 of the product is displayed, which may be contained in the capsule as a separate image from the smaller image displayed in the listing zone 42, or which may be generated from the same image information on the capsule, but at a larger scale. Other information displayed in the detail area 56 in the embodiment shown also includes the product price 60, merchant name 62, product name 48 and category 52, a more detailed description 64 than in the listing zone 42, different hyperlinks to the product manufacturer 66, keywords 68, and a list of related products 70. The user can preferably use a scroll feature in the viewer to view any additional information that is not initially displayed, or can access this information by making an alternative input.

Certain pieces of information displayed from the capsule include links, such as to web pages or to other information in the capsule. The manufacturer, key words, and related products information displayed 66, 68, 78 include such links. The links in the manufacturer information 66 preferably includes hyperlinks to web pages on the manufacturer's web site where the user can bring find additional information about the manufacturer and its products. The capsule information may also include a script to be run by the capsule viewer or browser to set or change any link web addresses, such as that of the manufacturer or capsule administrator.

The key words information 68 preferably include links to other information in the capsule, such as lists of other products, or may include links to the merchant's web site where other products with capsules having similar key words are present. The links in the key words 68 information can also be configured for launching a search engine to find capsules with the selected key words or for loading lists of capsules with the selected key word directly from the capsule administrator computer. The key words are preferably also used as metatags. The metatags contained in the capsule administrator computer are also preferably searchable by a web search engine.

The related products information 70 preferably includes links to other capsules found on the capsule administrator computer. Upon activating one of these links, the capsule administrator computer sends the requested capsule, which can then be accessed and displayed by the capsule viewer. By providing the related products information, a manufacturer or merchant can decide what products would commonly be of interest to a user, and sales what products would benefit from having a link in the displayed capsule.

The capsule viewer may also advantageously contact the capsule administrator whenever the user's computer is online in order to update the capsule information for any capsules stored locally by the user. This ability may also be implemented as a capsule viewer setting that the user can set to their preferred default operation. For example, the user may set a specific time interval for the capsule viewer to wait between capsule information update attempts, so as to reduce online traffic.

The capsule viewer may also provide promotional alerts to the user when so instructed by the capsule administrator. A promotional alert would preferably provide the user with information on price specials and other marketing promotions.

In a preferred embodiment the capsule viewer may provide the ability for the user to search for capsules by entering the name of the product into a search input window 76, or even by browsing the local or networked storage area 69. Also, in another embodiment, the capsule viewer may query the capsule administrator database to determine other accesses to a particular capsule, which information may then be used by the user to download a capsule from another user.

Figure 12:
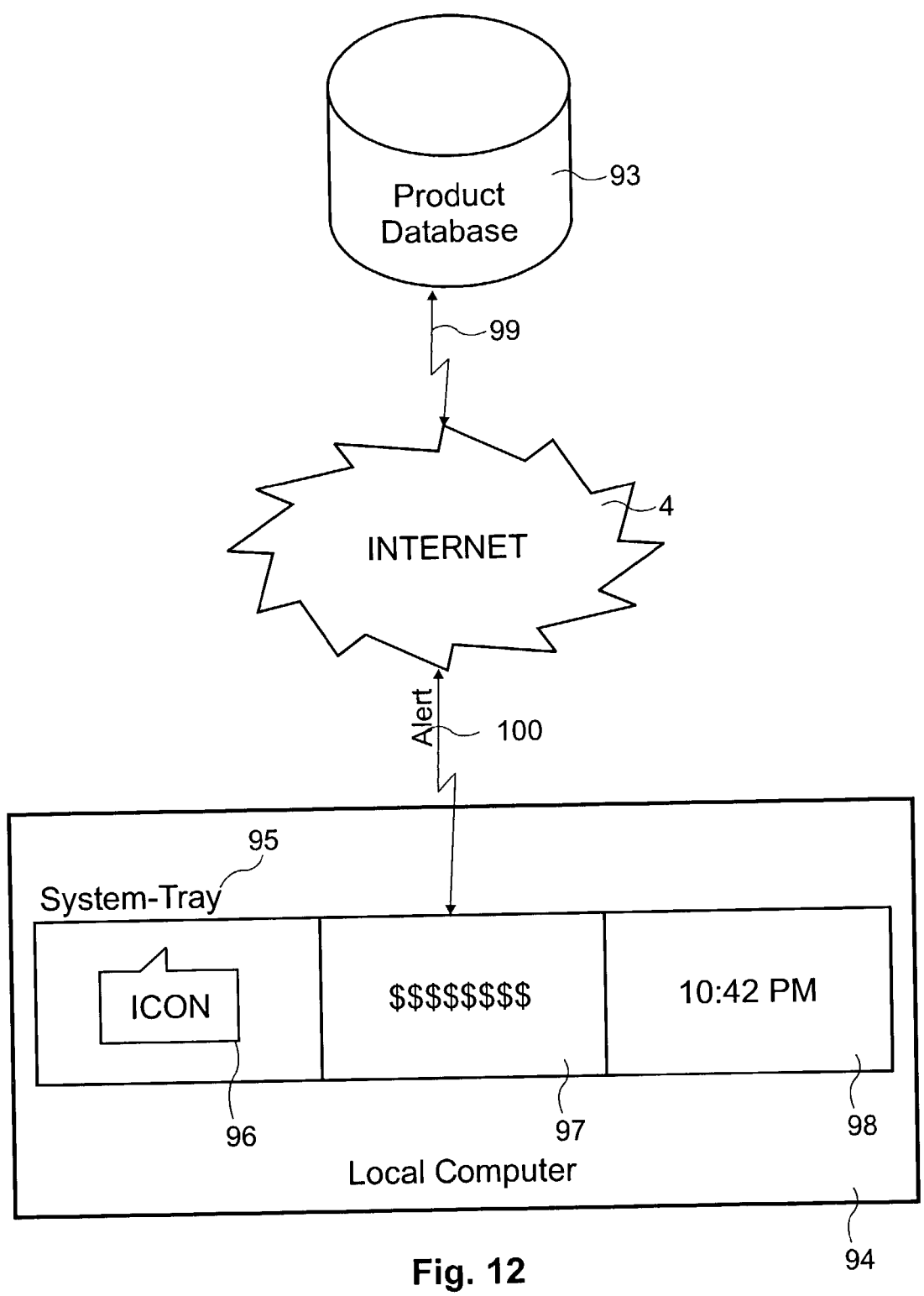
FIG. 12 depicts the process of updating capsule information for a product in accordance with a preferred embodiment of the current invention.

FIG. 12 shows the process of updating capsule information for a product of a preferred embodiment of the current invention. Capsules on a user's local computer 94 are preferably continuously compared against a product capsule database 93, using the Internet 4, whenever the user's computer is online. If the capsule information on the product capsule database 93 has changed, an update to the user's local computer 94 is indicated. For example, a user may have saved a capsule with information on a particular product. The user's local computer 94 may then perform a background database query 99, preferably over the Internet 4, to gather updated information on the product.

When updated information has been provided, the update may be communicated to the user's local computer 94 by an alert 100, which also may be preferably sent over the Internet 4. Advantageously, the user's local computer 94 would be configured to display the alert 100, perhaps in a system tray entry 95. As an example, a price information update 97 and update time 98 could be displayed on a system tray entry 95 on the user's local computer 94. The system tray entry 95 would preferably include an icon 96, which may display the capsule information for the product when selected by the user.

A capsule viewer may also preferably be created which allows the creation of a product auction from capsule information. A capsule used in such an auction would advantageously include a defined expiration date for the capsule information. The viewer would preferably create a current bid icon on the user's computer, displaying the current bid amount, as well as a connection, possibly over the Internet 4, to keep the current bid price updated.

Ultimately, a preferred embodiment of the current invention includes enabling the product merchant and/or capsule administrator to collect demographic and other information from the user and/or the user's computer. In one embodiment a user may be required to register, thus providing registration information. In another embodiment, the user's geographical address may be determined from communications routing information. This information may then be used for sales and marketing purposes. For example, a user who has purchased or shown an interest in ski jackets may be targeted for ski boot advertising. Likewise, the geographic location of the user may be used by a product merchant to focus advertising. For instance, a user in Florida may be less interested in ski boots than a user in Colorado, while a user in Colorado may be less interested in scuba gear than a user in Florida.

In addition, according to an embodiment of the present invention, a capsule can contain information relating to multiple consumers' transaction history associated with that particular capsule. Such information, which can be kept anonymous, can be used by the merchants to better identify relationships between the capsules and products, thus enabling recommendation-type services. Moreover, each unique capsule can have a serial number associated with it, thereby making identification of capsules easier and more efficient. Consequently, all the information associated with the capsule will be also associated with the serial number.

Figure 13:
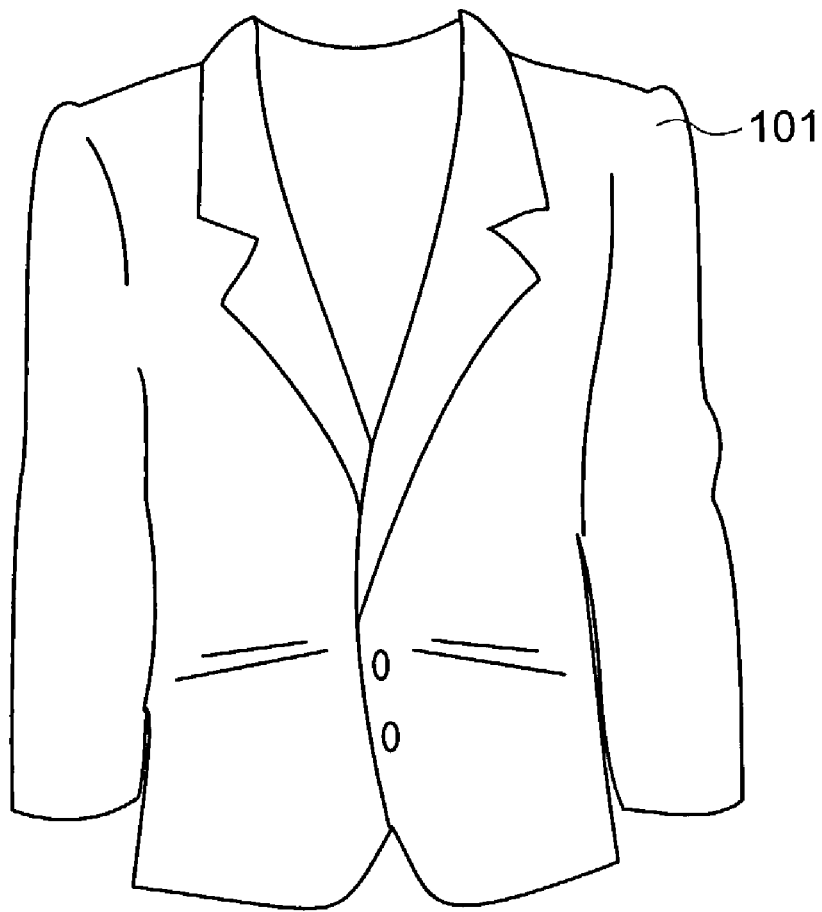
FIG. 13 depicts an icon such as may be implemented for an auction of a preferred embodiment of the current invention.
Figure 13:
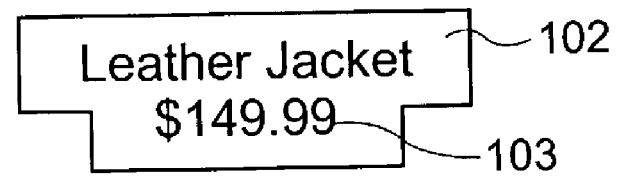

FIG. 13 depicts an icon such as may be implemented for an auction of a preferred embodiment of the current invention. An auction icon would advantageously include a scaled-down image of the product being auctioned 101, and may be accompanied by the product name 102, and the current bid price 103. As the auction progresses the current bid price would be updated.

Security

Security is an important component of the capsule system in accordance with the present invention. Typically anyone having access to a capsule server has access to everything on that server. Preferably, the capsule system records all major activity to maintain a complete audit trail. The items recorded for auditing may include: location and specifics of capsule instantiation, all data related to customizable capsules, all cross-server publication tracking information, all administration activity, all publication activity, access and execution information. In addition to help prevent unnecessary security complications, capsules have an expiration date that can be updated. Since all capsule data is encrypted, once the expiration date has passed, the capsule contents are useless. Critical capsules can have rolling expiration dates.

Security breaches, while a concern since they can encompass multiple sources o information, are of minimal impact. The source data is all still secured via the same mechanisms, independent of capsule. The data that is exposed is also secured across capsule servers through multiple mechanisms, including data filtering. In addition, since all activity at these layers is audited, determining the extent of any breach can be handled quickly.

In accordance with a preferred embodiment of the present invention, the communication between the capsule Organizer on the client and the capsule servers is through Secure Sockets Layer (SSL). This includes all capsule operations and notifications.

Since the source content has been distilled through a two-stage linguistic process, the keywords in the capsules could no longer have the same degree of security as the source document. In addition, through the distributed server relationship configuration, this data can be further filtered to improve security.

As discussed above, capsules are stored on the capsule servers. Client instantiation is simply a pointer to the server. Consequently, no capsule information is persisted beyond the reach of the servers, allowing for tight control of the information. All links (molecules, queries, and patterns) to capsules are available to everyone who has access to the same server. However, links across servers are controlled via the distributed server security.

During the first stage of the encapsulation process intermediate indices are produced. If persisted, the indices need to be secured similarly to source documents. However, they can always be destroyed when the second stage of the distillation process is complete.

Source content is secured through existing processes and mechanisms. Preferably, only a reference to the source document is published in the capsule and this can be filtered across servers.

In accordance with another embodiment of the present invention, capsules can be distributed across servers for enhanced performance and security. When a capsule server is created, it is told about the other capsule servers in the domain and its relationship with these other servers. All data on a single server will preferably have the same relationship to another server. However, a server can have different relationships with different servers. For example, the relationship types can be:

Peer—The two servers have equal access to each other and are logically a single server. This is typically done when the servers are split for performance.

Publish—The capsules can be published out. If the other server is not set to publish, this is a one-sided publish relationship, i.e., one server will have access to both sets of information while the other server will not. There are sub-relationships within publish, including which capsule types to publish, whether to publish molecular relationships, and what elements of the tags and keywords to publish.

Agent—This allows agents to run across the servers. This is also directional, and has sub-relationships to indicate what capsules can have agent access. The sub-relationships cannot exceed the publish sub-relationships, but can be more constraining.

The above description is presented to enable any person of ordinary skill in the art to make and use the present invention. Various modifications to the preferred embodiment will be readily apparent to those of ordinary skill in the art, and the disclosure set forth herein may be applicable to other embodiments and applications without departing from the spirit and scope of the present invention and the claims hereto appended. For example, the live capsule system can be used on an internal computer network or across the internet. The inclusion of information on any desired topic in the capsule along with the links to other sources of related information as well as the automatic updating of such information makes this invention a versatile and important tool for information gathering. Thus, the present invention is not intended to be limited to the specific embodiments described herein, but is to be accorded the appropriate scope consistent with the general disclosure that is provided.

What is claimed is:

1. A method of sharing information related to a subject among a plurality of computers, the method comprising the steps of:

opening and extracting information from a source file about the subject;

creating at least one capsule containing the extracted information;

linking the capsule to a portion but less than all of the source file so that communication of the portion of the source file causes communication of the linked capsule as well to the plurality of computers;

loading the at least one capsule onto at least one of the plurality of computers; and communicating the at least one capsule over a communications network that connects the plurality of computers to communicate the linked capsule.

2. The method of claim 1, further comprising the step of updating one or more aspects of the subject within the capsule on at least two of the plurality of computers.

3. The method of claim 2, wherein the updating step includes the step of the server notifying the at least one of the plurality of computers of the update.

4. The method of claim 2, wherein the updating step is performed by a client application by sending requests to a server.

5. The method of claim 1, further comprising the step of displaying the information from the capsule by:

locating the capsule on a storage medium of the at least one of the plurality of computers;

identifying certain information in the capsule; and displaying the information from the capsule.

6. The method of claim 1 which further comprises:

sending identifying information about the capsule from one to another of the plurality of computers;

receiving from the other computer updated information about the aspects in the capsule;

updating the capsule on the storage medium of the at least one of the plurality of computers with the updated information; and optionally displaying the updated information.

7. The method of claim 1, further comprising the step of linguistically distilling the source file into a set of keywords and tag data.

8. The method of claim 7, wherein the distillation step includes the steps of indexing the source file.

9. The method of claim 7, further comprising the step of linking the at least one capsule with another such that the linked capsules are communicated together, the link having a strength dependent on the set of keywords.

10. The method of claim 1, further comprising the step of managing the at least one capsule, the managing step comprising the steps of:
   instantiating the capsule;
   notifying the at least one of the plurality of computers or the server about the capsule changes;
   linking the instantiated capsule to another capsule, thereby creating molecules; and
   executing queries to search for related capsules.

11. The method of claim 1, further comprising the step of creating patterns among capsules, thereby exploring capsule relationships.

12. The method of claim 11, further comprising the step of identifying and displaying one capsule from another based on the relationship among the capsules.

13. The method of claim 1, further comprising the step of encrypting capsule information on the server.

14. The method of claim 1, which further comprises providing the capsule with an expiration date after which the capsule information is no longer available.

15. The method of claim 1, wherein the information within the capsule is related to commercial transaction between a merchant and a consumer.

16. The method of claim 1, wherein the communications network is an internal communications network or the Internet.

17. The method of claim 1, wherein the extracted information includes at least non-image information.

18. The method of claim 1, wherein the capsule is stored in a second file that is linked to the source file.

19. The method of claim 1, wherein the extracted information includes information from another portion of the source file.

20. The method of claim 1, further comprising:
   displaying the portion of the source file that has a plurality of said linked capsules;
   displaying identities of the linked capsules;
   selecting a capsule; and
   displaying content of the selected capsule.

21. The method of claim 20, further comprising
   communicating with an administrator of the capsule that has control over the content of the capsule; and
   conducting a transaction based on the content of the capsule.

22. A system for sharing information related to a subject among a plurality of computers, including a server, the system comprising:
   a computer with a processor operatively connected to a display, said processor configured to operate viewer software to open and process a portion, but less than all of, a source file and a linked software capsule so that communication of the portion of the source file to another computer causes communication of the capsule as well to the other computer;
   said software capsule containing information about one or more aspect of the subject and an identifier that corresponds to the capsule; and
   said viewer software configured for:
      locating capsules having an identifier;
      displaying the information contained in the capsule; and
      obtaining updated information on the subject from another computer.

23. The system of claim 22, wherein the viewer software is further configured for storing the updated information of the subject in the capsule.

24. The system of claim 22, wherein the viewer software is configured for downloading the capsule from one of the plurality of computers to another.

25. The system of claim 22, wherein the viewer software is configured for downloading the software capsule over an internal communications network or the Internet.

26. The system of claim 22, wherein the software capsule is attached to a media file, and the viewer software is configured for enabling a user to update the software capsule when the media file is accessed.

27. The system of claim 26, wherein the media file comprises an image file, motion video, or digital audio file.

* * * * *

UNITED STATES PATENT AND TRADEMARK OFFICE
CERTIFICATE OF CORRECTION

| | | |
|---|---|---|
| PATENT NO. | : 7,149,754 B2 | Page 1 of 1 |
| APPLICATION NO. | : 10/197809 | |
| DATED | : December 12, 2006 | |
| INVENTOR(S) | : Miller et al. | |

It is certified that error appears in the above-identified patent and that said Letters Patent is hereby corrected as shown below:

<u>Title Page</u>:
Before Item (51), insert the following:

-- Related U.S. Application Data
(60)  Provisional application No. 60/306,498, filed on Jul. 19, 2001. --

Signed and Sealed this

Twenty-seventh Day of November, 2007

JON W. DUDAS
*Director of the United States Patent and Trademark Office*